(12) United States Patent  
Kajiyama et al.

(10) Patent No.: US 9,054,494 B2  
(45) Date of Patent: Jun. 9, 2015

(54) PULSED LASER OSCILLATOR AND METHOD FOR CONTROLLING PULSED LASER OSCILLATION

(71) Applicant: V TECHNOLOGY CO., LTD., Yokohama-shi, Kanagawa (JP)

(72) Inventors: Koichi Kajiyama, Yokohama (JP); Michinobu Mizumura, Yokohama (JP); Tetsuya Kiguchi, Yokohama (JP); Daisuke Ishii, Yokohama (JP); Yoshikatsu Yanagawa, Yokohama (JP); Masami Takimoto, Yokohama (JP)

(73) Assignee: V TECHNOLOGY CO., LTD., Yokohama-shi (JP)

( * ) Notice: Subject to any disclaimer, the term of this patent is extended or adjusted under 35 U.S.C. 154(b) by 0 days.

(21) Appl. No.: 14/151,176

(22) Filed: Jan. 9, 2014

(65) Prior Publication Data

US 2014/0126591 A1    May 8, 2014

Related U.S. Application Data

(63) Continuation of application No. PCT/JP2012/067446, filed on Jul. 9, 2012.

(30) Foreign Application Priority Data

Jul. 11, 2011 (JP) .................................. 2011-153283  
Jul. 14, 2011 (JP) .................................. 2011-155734  
Jul. 14, 2011 (JP) .................................. 2011-155735

(51) Int. Cl.  
*H01S 3/10* (2006.01)  
*H01S 3/11* (2006.01)  
*H01S 3/107* (2006.01)  
*H01S 3/08* (2006.01)  
*H01S 3/115* (2006.01)  
(Continued)

(52) U.S. Cl.  
CPC . *H01S 3/11* (2013.01); *H01S 3/107* (2013.01); *H01S 3/08054* (2013.01); *H01S 3/092* (2013.01); *H01S 3/10038* (2013.01); *H01S 3/115* (2013.01); *H01S 3/1611* (2013.01); *H01S 3/2308* (2013.01); *H01S 3/005* (2013.01); *H01S 3/1643* (2013.01)

(58) Field of Classification Search  
CPC ....... H01S 3/005; H01S 3/08; H01S 3/08054; H01S 3/10; H01S 3/10007; H01S 3/10046; H01S 3/10061; H01S 3/1308  
USPC ......................... 372/12, 25, 27, 29.015, 29.02  
See application file for complete search history.

(56) References Cited

U.S. PATENT DOCUMENTS 6,281,471 B1    8/2001    Smart  
6,292,505 B1    9/2001    Takenaka et al.  
(Continued)

FOREIGN PATENT DOCUMENTS

JP     07-335959 A    12/1995  
JP     09-181375 A    7/1997  
(Continued)

*Primary Examiner* — Dung Nguyen  
(74) *Attorney, Agent, or Firm* — Foley & Lardner LLP

(57) ABSTRACT

A pulsed laser oscillator includes at least one first electrooptical element that polarizes light according to an applied voltage and a voltage control unit that applies a voltage to the first electrooptical element and controls the voltage. The voltage control unit changes over time a voltage value applied to the first electrooptical element, to control a pulse width of laser light.

13 Claims, 15 Drawing Sheets

(51) Int. Cl.
*H01S 3/092* (2006.01)
*H01S 3/16* (2006.01)
*H01S 3/23* (2006.01)
*H01S 3/00* (2006.01)

(56) References Cited

U.S. PATENT DOCUMENTS

| | | | |
|---|---|---|---|
| 6,351,579 B1 * | 2/2002 | Early et al. | ............... 385/18 |
| 6,727,458 B2 | 4/2004 | Smart | |
| 7,126,746 B2 | 10/2006 | Sun et al. | |
| 7,348,516 B2 | 3/2008 | Sun et al. | |
| 7,582,848 B2 | 9/2009 | Smart | |
| 7,679,030 B2 | 3/2010 | Smart | |
| 7,750,268 B2 | 7/2010 | Smart | |
| 2002/0023901 A1 | 2/2002 | Smart | |
| 2004/0188399 A1 | 9/2004 | Smart | |
| 2005/0041976 A1 | 2/2005 | Sun et al. | |
| 2005/0067388 A1 | 3/2005 | Sun et al. | |
| 2006/0045150 A1 | 3/2006 | Newman et al. | |
| 2006/0086702 A1 | 4/2006 | Smart | |
| 2008/0035614 A1 | 2/2008 | Smart | |
| 2008/0099453 A1 | 5/2008 | Smart | |
| 2008/0105664 A1 | 5/2008 | Smart | |
| 2008/0203071 A1 | 8/2008 | Sun et al. | |
| 2012/0187098 A1 | 7/2012 | Smart | |

FOREIGN PATENT DOCUMENTS

| | | |
|---|---|---|
| JP | 11-514109 A | 11/1999 |
| JP | 2000-124528 A | 4/2000 |
| JP | 2001-308426 A | 11/2001 |
| JP | 2002-311401 A | 10/2002 |
| JP | 2003-069118 A | 3/2003 |
| JP | 2003-518440 A | 6/2003 |
| JP | 2004-291010 A | 10/2004 |
| JP | 2007-503125 A | 2/2007 |
| JP | 2007-237221 A | 9/2007 |
| JP | 2009-285721 A | 12/2009 |
| JP | 2010-222240 A | 10/2010 |
| WO | WO 98/56186 A1 | 12/1998 |
| WO | WO 2006/026143 A2 | 3/2006 |

* cited by examiner

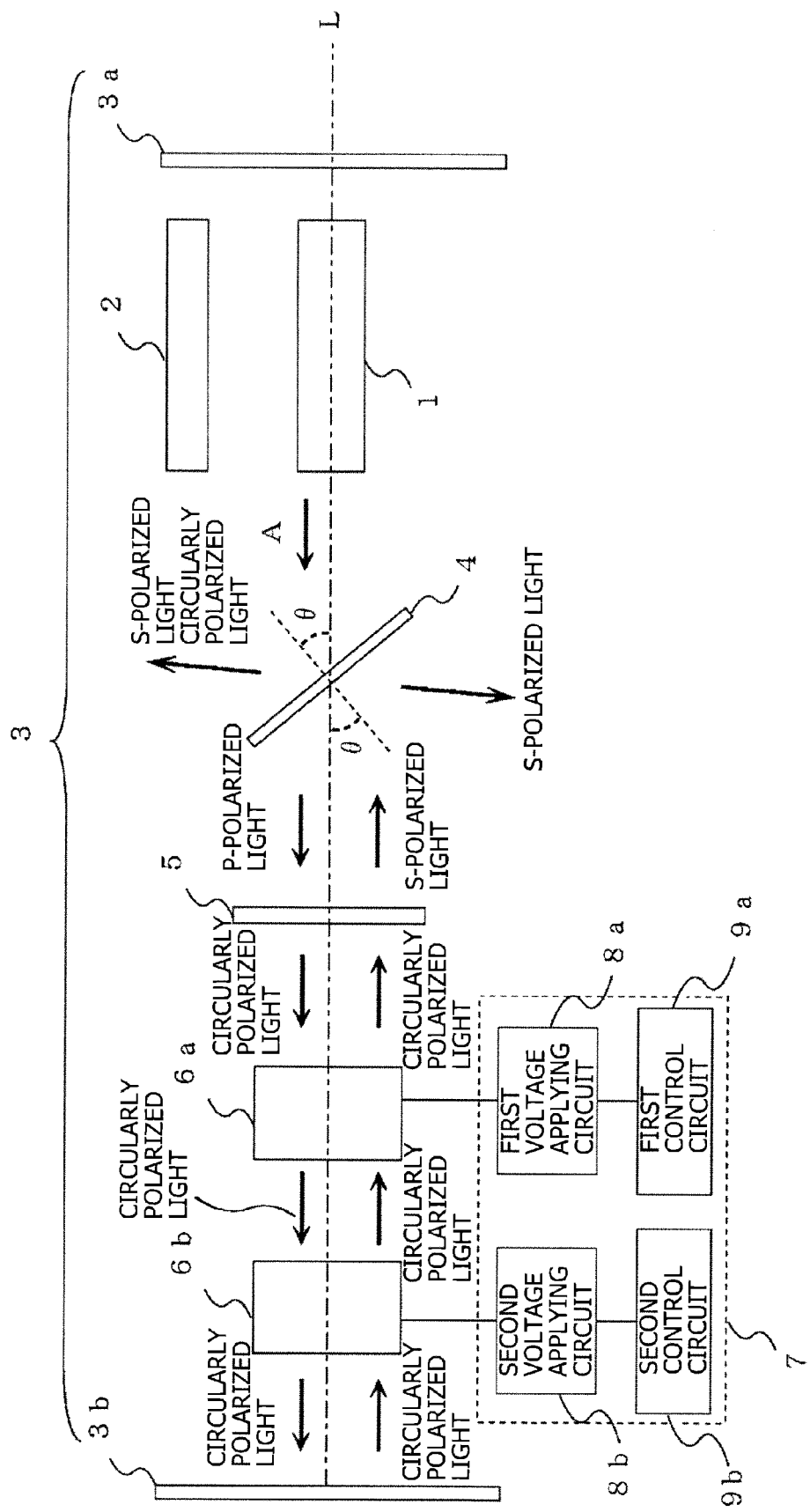

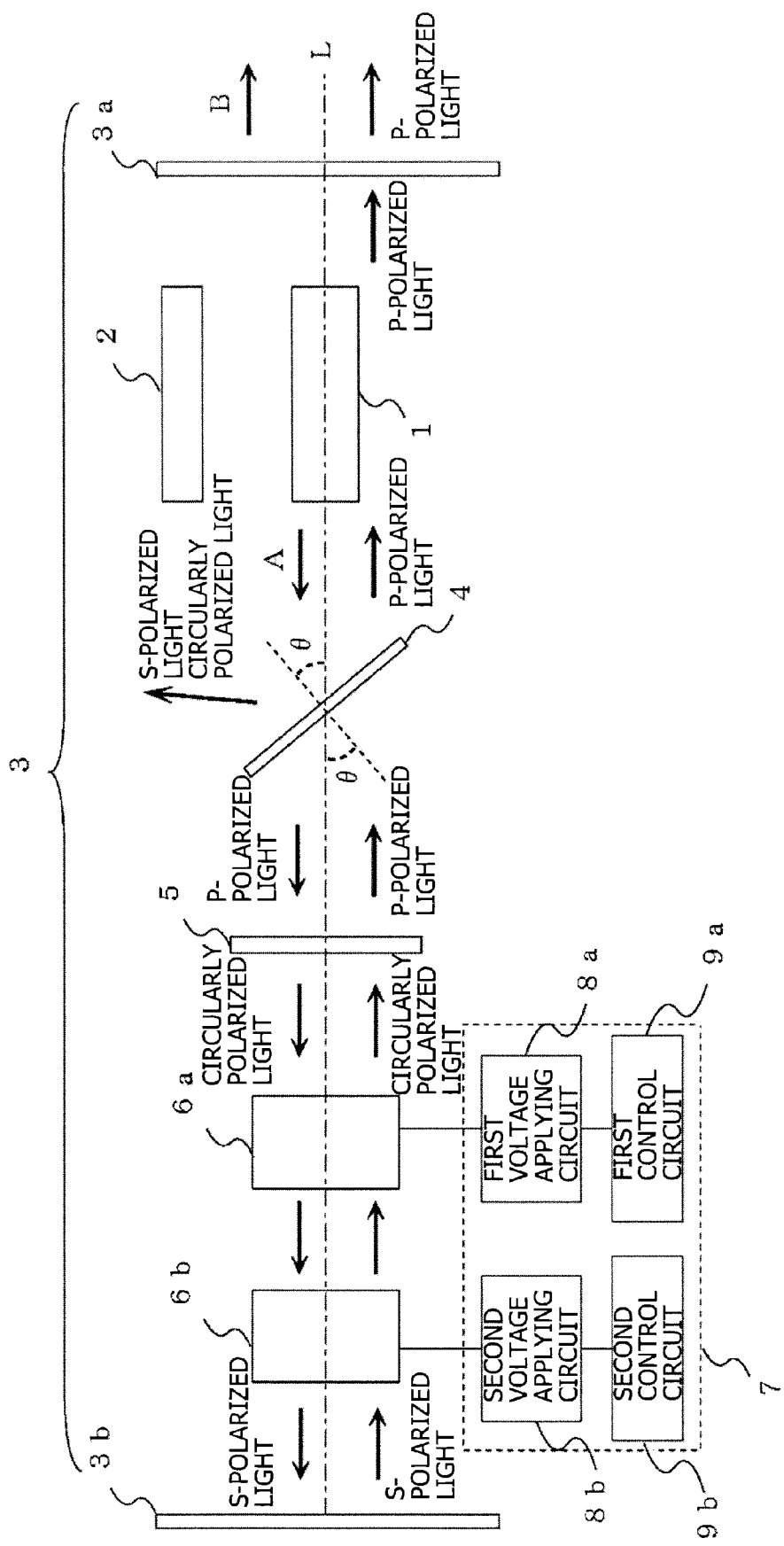

RELATIONSHIP BETWEEN VOLTAGE (V)
APPLIED TO POCKELS CELL AND OUTPUT ENERGY

PULSED LASER OSCILLATOR AND METHOD FOR CONTROLLING PULSED LASER OSCILLATION

This application is a continuation application of PCT/JP2012/067446, filed on Jul. 9, 2012.

BACKGROUND OF THE INVENTION

1. Field of the Invention

The present invention relates to a pulsed laser oscillator provided with an electrooptical element that polarizes light according to an applied voltage, and to a method of controlling pulsed laser oscillation. More specifically, the present invention relates to a pulsed laser oscillator that changes over time a voltage applied to an electrooptical element, so that a pulse width of laser light can be increased and peak energy of the output pulsed laser light can be decreased, and to a method of controlling pulsed laser oscillation.

2. Description of Related Art

Conventionally, there has been a pulsed laser oscillator that includes a laser medium, a light source for exciting the laser medium, and a resonator allowing light which has been emitted from the laser medium to reciprocate and to be amplified, to obtain pulsed laser light, in which a Q-switching element and a cavity dump element are located in the resonator in which a high-reflectance mirror is located at one side of the laser medium and a low-reflectance mirror is located at the other side thereof, to allow Q-switching oscillation to occur in a state in which the laser light is completely confined in the resonator, followed by operating the cavity dump element to cause cavity dumping near a peak level of the pulsed laser light accumulated in the resonator, so that energy accumulated in the resonator can be immediately drawn out (see, for example, Japanese Laid-open Patent Application Publication No. 2003-69118 A).

However, in such a conventional pulsed laser oscillator, since the energy accumulated in the resonator is immediately drawn out, the peak energy of the output pulsed laser light becomes too large, and thus, an object to be irradiated by the laser might be damaged.

SUMMARY OF THE INVENTION

Thus, in view of the above problem, it is an object of the present invention to provide a pulsed laser oscillator that increases a pulse width, to decrease peak energy of output pulsed laser light, and to provide a method of controlling pulsed laser oscillation.

In order to achieve the object, the pulsed laser oscillator according to an aspect of the present invention includes: at least one first electrooptical element that polarizes light according to an applied voltage; and a voltage control unit that applies a voltage to the first electrooptical element and controls the voltage, and the voltage control unit changes over time a voltage value applied to the first electrooptical elements, to control a pulse width of laser light.

In this case, at least one first electrooptical element may be a plurality of first electrooptical elements, and each voltage value applied to each of the plurality of first electrooptical elements may be changed over time.

Preferably, the voltage control unit may change in a stepwise manner a rate of change of the voltage value applied to the first electrooptical element.

In addition, the plurality of first electrooptical elements may be two first electrooptical elements, and each of the two first electrooptical elements may be applied with a voltage in directions opposite to each other by the voltage control unit.

Furthermore, at least one first electrooptical element may be at least one Pockels cell, and the pulsed laser oscillator may further include a quarter-wave plate.

Still further, on an optical path of the laser light, a laser attenuator including: two polarizing elements located in a crossed Nicols arrangement; at least one second electrooptical element that is located between the two polarizing elements and that rotates a plane of polarization of laser light passes therethrough by being applied with a voltage; and a control unit that controls a voltage value applied to the second electrooptical element and an applying timing thereof, may be further included.

In this case, at least one second electrooptical element may be at least one Pockels cell.

In addition, a plurality of the Pockels cells may be arranged in series.

Preferably, the laser attenuator may be located at a downstream of an optical amplifier located at the optical path of the laser light.

Furthermore, a method of controlling pulsed laser oscillation according to another aspect of the present invention, includes the step of changing a voltage applied to at least one first electrooptical element that polarizes light according to the applied voltage, to control oscillation of laser light, and further includes the step of changing over time a voltage value applied to the first electrooptical element, to control a pulse width of laser light.

In this case, at least one first electrooptical element may be a plurality of first electrooptical elements, and the step of changing over time the voltage value may include the step of changing over time each voltage value applied to each of the plurality of first electrooptical elements.

Preferably, the step of changing over time the voltage value may include the step of changing in a stepwise manner a rate of change of the voltage value applied to the first electrooptical element.

In addition, the plurality of first electrooptical elements may be two first electrooptical elements, and the method further includes the step of applying each of the two first electrooptical elements with a voltage in directions opposite to each other by a voltage control unit.

According to the present invention, the voltage value applied to the first electrooptical element can be changed over time by the voltage control unit, and accordingly, the pulse width of the laser light can be controlled. Thus, the pulse width of the output pulsed laser light can be increased, and the peak energy of the pulsed laser light can be decreased.

Furthermore, since the pulse width can be increased without using a beam splitter that separates laser light or a mirror for an optical duration system, a more compact pulsed laser oscillator can be provided.

Still further, when using the pulsed laser oscillator, it is not necessary to adjust the beam splitter or the mirror for the optical duration system, and accordingly, an operation for using the pulsed laser oscillator can be easier.

BRIEF DESCRIPTION OF THE DRAWINGS

FIG. 6 is a schematic diagram illustrating a state, in which a voltage is not applied, of a pulsed laser oscillator according to a second embodiment of the present invention;

FIG. 7 is a schematic diagram illustrating a state in which a voltage is applied according to the second embodiment;

FIGS. 8A and 8B are graphs schematically illustrating control of voltages applied to two Pockels cells according to the second embodiment, in which FIG. 8A illustrates control which applies a voltage to each of the two Pockels cells, and FIG. 8B illustrates a total applied voltage of the two Pockels cells in a state of FIG. 8A;

FIGS. 10A and 10B are graphs illustrating one example of a relationship between a voltage applied to the Pockels cells according to the second embodiment and output energy of pulsed laser light, in which FIG. 10A illustrates a state in which only one of Pockels cells is applied with the voltage, and FIG. 10B illustrates a state in which the two Pockels cells are applied with the voltages in the same direction;

FIGS. 14A and 14B are explanatory views illustrating that the laser attenuator selectively decreases energy of one pulse of laser light during a certain time, in which FIG. 14A illustrates a state before the decrease and FIG. 14B illustrates a state after the decrease; and FIGS. 15A and 15B are explanatory views illustrating voltage control for selectively decreasing the energy of the one pulsed laser light during the certain time performed by the laser attenuator, in which FIG. 15A illustrates a temporal change of the applied voltage and FIG. 15B illustrates a temporal change of transmittance at that time.

DESCRIPTION OF THE PREFERRED EMBODIMENTS

Figure 1:
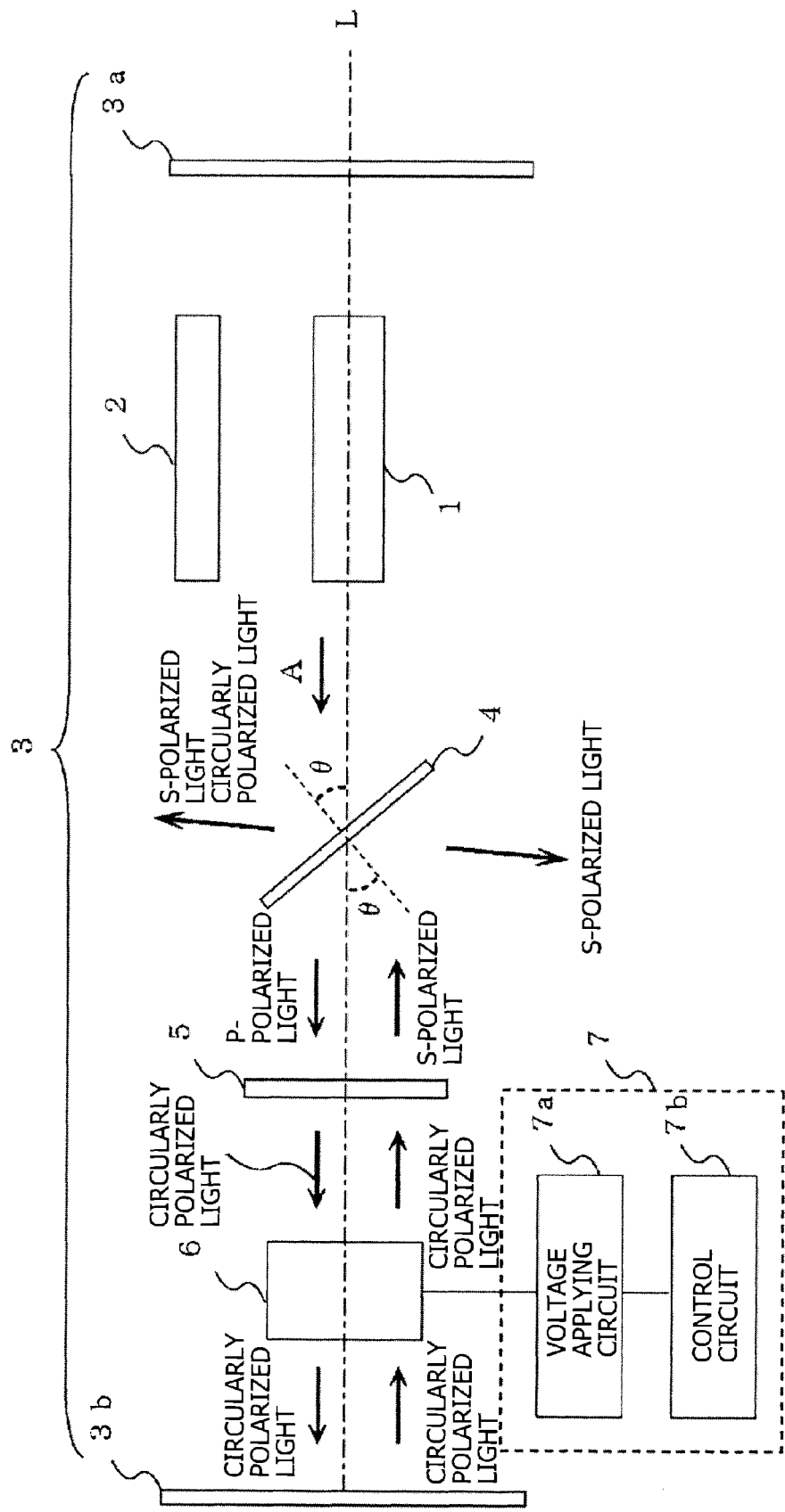
FIG. 1 is a schematic diagram illustrating a state, in which a voltage is not applied, of a pulsed laser oscillator according to a first embodiment of the present invention.

Hereunder, embodiments of the present invention will be described in detail with reference to the accompanying drawings. FIG. 1 is a diagram illustrating a pulsed laser oscillator according to a first embodiment of the present invention. The pulsed laser oscillator is a YAG laser that generates a giant pulse by means of a Q-switching, which generates the giant pulse by switching a Q factor (indicating (stored energy in a below-mentioned optical resonator 3)/(energy loss emitted out from the optical resonator 3)). The YAG laser includes a YAG rod 1, a flash lamp 2, the optical resonator 3, a polarizer 4, a quarter-wave plate 5, a Pockels cell 6, and a voltage control unit 7.

The YAG rod 1 emits light by being irradiated with light from the below-mentioned flash lamp 2, and the emitted light is amplified by stimulated emission, As illustrated in FIG. 1, the YAG rod 1 is a solid laser medium that emits light along an optical axis L. Instead of the YAG rod 1, another laser medium, such as Nd:YAG rod, Er:YAG rod, or the like, may be used.

On a side face of the YAG rod 1 (corresponding to an upper side of YAG rod 1 in FIG. 1), the flash lamp 2 is located. The flash lamp 2 irradiates light on the YAG rod 1, to cause the YAG rod 1 start to emit light. For example, a xenon flash lamp or a laser diode may be used as the flash lamp 2.

On left and right sides of the YAG rod 1 illustrated in FIG. 1, a front mirror 3a and a rear mirror 3b are located. The front mirror 3a and rear mirror 3b are configured to let light emitted from the YAG rod 1 be repeatedly reflected between the two mirrors, and the front mirror 3a and rear mirror 3b constitute the optical resonator 3, which causes the stimulated emission in the YAG rod 1 to amplify coherent light.

The front mirror 3a is a partially transmissive mirror which transmits some of incident light, and is located at the optical axis L of the light emitted from the YAG rod 1 and on a laser-light emitting side. Some of the laser light immediately amplified by the Q switching is drawn out from the optical resonator 3 through the front mirror 3a.

Furthermore, the rear mirror 3b is a total reflection mirror which is located at the optical axis L and on the other side of the YAG rod 1, which is opposite to the front mirror 3a, and which lets light reciprocate between the rear mirror 3b and the front mirror 3a along the optical axis L.

On the optical axis L and between the rear mirror 3b and the YAG rod 1, the polarizer 4 is located. The polarizer 4 reflects s-polarized light, which is a polarization component of incident light perpendicular to an incidence plane, to transmit p-polarized light, which is a polarization component parallel to the incidence plane, and thus, the polarizer 4 is a polarizing element that performs as a shutter in the Q switching. Materials of the polarizer 4 may be glass or plastic. The polarizer 4 is located to be inclined with respect to the optical axis L so that an incidence angle θ of the incident light becomes the Brewster's angle, in which a reflectance of the p-polarized light is zero. A plurality of polarizers 4 may be located. Furthermore, the polarizer 4 may transmit either one of the s-polarized light and the p-polarized light, and another polarizing element, such as a polarizing prism, a polarizing filter, or the like, may be used, instead of the abovementioned polarizing element.

The terms "s-polarized light" and "p-polarized light" as used herein indicate s-polarized light and p-polarized light in relation to the polarizer 4.

Between the polarizer 4 and the rear mirror 3b, the quarter-wave plate 5 is located. The quarter-wave plate 5 makes a phase difference of 90° (π/2) to a polarization component of the incident light, to convert from linearly polarized light (the above-mentioned s-polarized light and p-polarized light) to circularly polarized light, or from circularly polarized light to linearly polarized light, and the quarter-wave plate 5 is located at the optical axis L on the left side of the polarizer 4, as illustrated in FIG. 1. The p-polarized light that has been emitted from the YAG rod 1 and is then transmitted through the polarizer 4 is converted to the circularly polarized light by the quarter-wave plate 5.

Between the quarter-wave plate 5 and the rear mirror 3b, the Pockels cell 6 is located. The Pockels cell 6 is a first electrooptical element that polarizes light according to an applied voltage and located at the optical axis L on the left side of the quarter-wave plate 5, as illustrated in FIG. 1. The Pockels cell 6 does not polarize light in a state in which a voltage is not applied thereto, but polarizes light when the voltage is applied thereto, and a degree of the polarization depends on a degree of the applied voltage.

To the Pockels cell 6, the voltage control unit 7 is electrically connected. The voltage control unit 7 applies a voltage to the Pockels cell 6 and controls the applied voltage, and includes a voltage applying circuit 7a and a control circuit 7b.

The voltage applying circuit 7a applies a voltage to the Pockels cell 6, and it is electrically connected to the Pockels cell 6. The voltage applying circuit 7a is connected to the control circuit 7b, which controls the application of voltage to the Pockels cell 6 applied by the voltage applying circuit 7a, to change a degree of polarization of the light entering the Pockels cell 6, thereby controlling oscillation of the laser light.

Next, an operation of the pulsed laser oscillator having such a configuration, and a method of controlling the pulsed laser oscillation will be described with reference to FIGS. 1-5.

To oscillate the pulsed laser by the pulsed laser oscillator, first, the control circuit 7b transmits a signal to the voltage applying circuit 7a, to control the voltage applying circuit 7a so that the voltage applied to the Pockels cell 6 becomes 0 V. In this state, when the flash lamp 2 emits light and irradiates the light on the YAG rod 1, some of the atoms in the YAG rod 1 are excited, and accordingly, light is emitted from the YAG rod 1 along the optical axis L. As illustrated in FIG. 1, the light emitted from the YAG rod 1 toward the polarizer 4 (in the direction of an arrow A) enters the polarizer 4 at an incidence angle θ, which is the Brewster's angle. Among the components of the entering light, p-polarized light is transmitted through the polarizer 4, and s-polarized light and circularly (or elliptically) polarized light are reflected by the polarizer 4, thereby propagating away from the optical axis L.

The p-polarized light transmitted through the polarizer 4 enters the quarter-wave plate 5, so that the phase difference of 90° (π/2) is induced, and thus, the p-polarized light is converted to circularly polarized light, and then enters the Pockels cell 6. Since no voltage is applied to the Pockels cell 6, the incident light is transmitted therethrough without being polarized. Thus, as illustrated in FIG. 1, the circularly polarized light which has entered the Pockels cell 6 is transmitted through the Pockels cell 6 without being converted from the circularly polarized light, and then, it is reflected by the rear mirror 3b, transmitted again though the Pockels cell 6, and enters the quarter-wave plate 5.

When the circularly polarized light enters the quarter-wave plate 5, an additional phase difference of 90° (π/2) is induced, and accordingly, the circularly polarized light is converted to s-polarized light (that is, in a state in which the phase thereof is shifted by 180° (π) with respect to the p-polarized light emitted from the YAG rod 1 and transmitted through the polarizer 4), and then, it enters the polarizer 4 at an incidence angle θ, which is the Brewster's angle. Since the polarizer 4 has the function of reflecting the s-polarized light as mentioned above, the entering s-polarized light is reflected by the polarizer 4 and propagates away from the optical axis L.

Thus, in a state in which the Pockels cell 6 is not applied with a voltage, the light emitted from the YAG rod 1 might be reflected by the polarizer 4, so that the light cannot enter again the YAG rod 1, and thus, oscillation does not occur in the optical resonator 3, so that oscillation of the pulsed laser is suppressed.

Next, after this state in which a voltage is not applied is maintained until the number of atoms excited in the YAG rod 1 reaches a number which is required to output desired energy as the pulsed laser light (until population inversion becomes sufficiently large), the control circuit 7b makes the voltage applied to the Pockels cell 6 by the voltage applying circuit 7a change. When a predetermined voltage is applied to the Pockels cell 6 by the voltage applying circuit 7a, the Pockels cell 6 performs as the quarter-wave plate 5.

Figure 2:
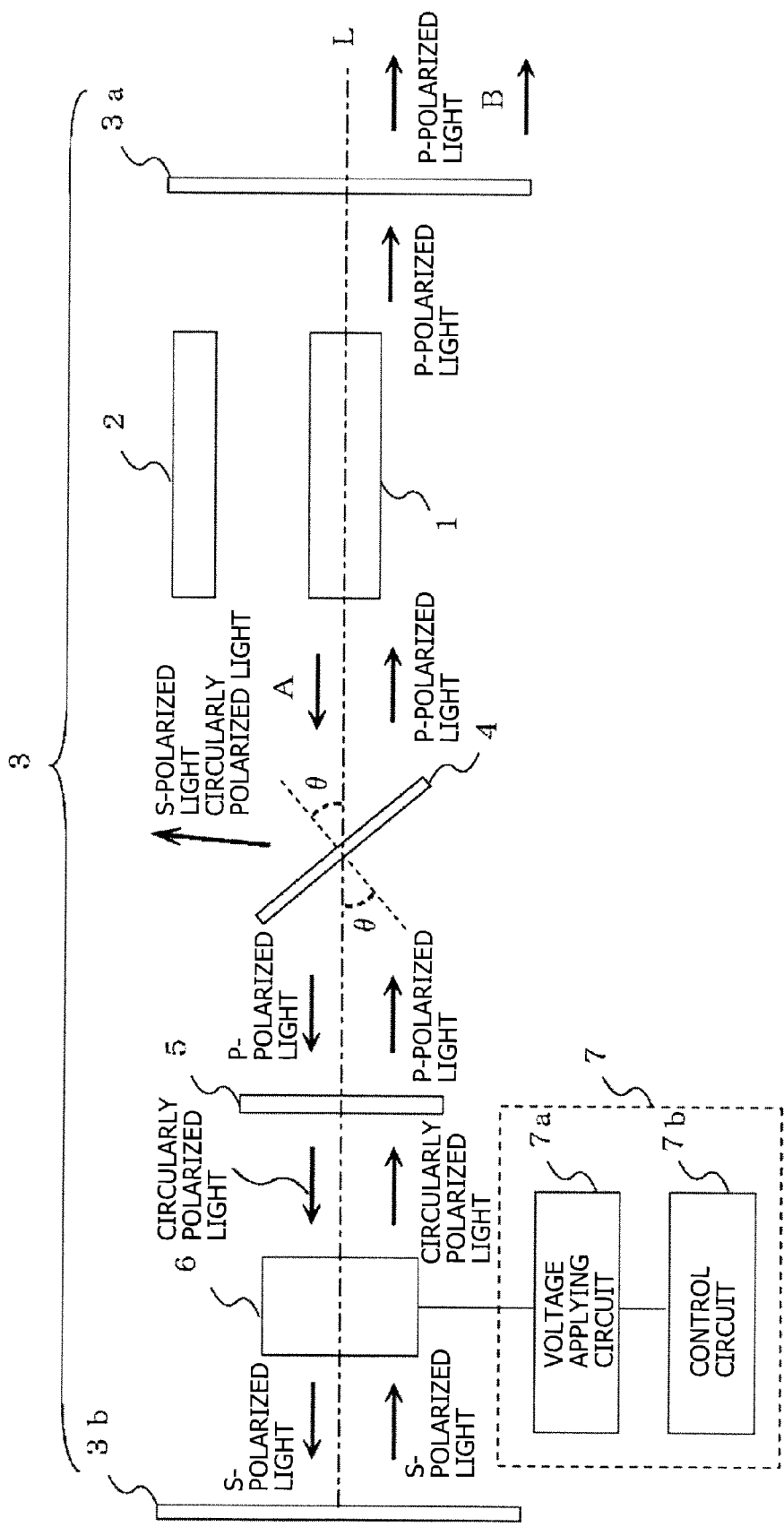
FIG. 2 is a schematic diagram illustrating a state in which a voltage is applied according to the first embodiment.

In a state in which a voltage is applied to the Pockels cell 6, the light emitted from the YAG rod 1 in the direction of the arrow A is converted to the p-polarized light by the polarizer 4 and converted to the circularly polarized light by the quarter-wave plate 5, and then enters the Pockels cell 6, as illustrated in FIG. 2, in the same manner as in the state in which a voltage is not applied. Since the Pockels cell 6 performs as the quarter-wave plate 5 as mentioned above, the phase difference of 90° (π/2) is induced, so that the light which has entered the Pockels cell 6 is converted to s-polarized light (that is, in a state in which the phase thereof is shifted by 180° (π) with respect to the p-polarized light emitted from the YAG rod 1 and transmitted through the polarizer 4).

This s-polarized light is reflected by the rear mirror 3b and enters the Pockels cell 6 again, and accordingly, an additional phase difference of 90° is induced, so that the s-polarized light is converted to circularly polarized light (that is, in a state in which the phase thereof is shifted by 270° (3π/2) with respect to the p-polarized light emitted from the YAG rod 1 and transmitted through the polarizer 4). This circularly polarized light enters the quarter-wave plate 5, and accordingly, an additional phase difference of 90° is induced, so that the circularly polarized light is converted to p-polarized light (that is, in a state in which the phase thereof is shifted by 360° (2π) with respect to the p-polarized light emitted from the YAG rod 1 and transmitted through the polarizer 4).

This p-polarized light enters the polarizer 4 at an incidence angle θ, which is the Brewster's angle, and it is then transmitted through the polarizer 4. The light transmitted through the polarizer 4 enters the YAG rod 1 from the left side thereof in FIG. 2, to cause the stimulated emission in the YAG rod 1, and then the light is emitted from the right side of the YAG rod 1 in FIG. 2. The light is then reflected by the front mirror 3a, and travels through the YAG rod 1 from the right side to the left side in FIG. 2. The light reciprocates in the optical resonator 3 in the same manner thereafter, and thus, some of the coherent light, which is amplified by the stimulated emission, is output as a laser in a direction of an arrow B from the front mirror 3a.

Figure 3:
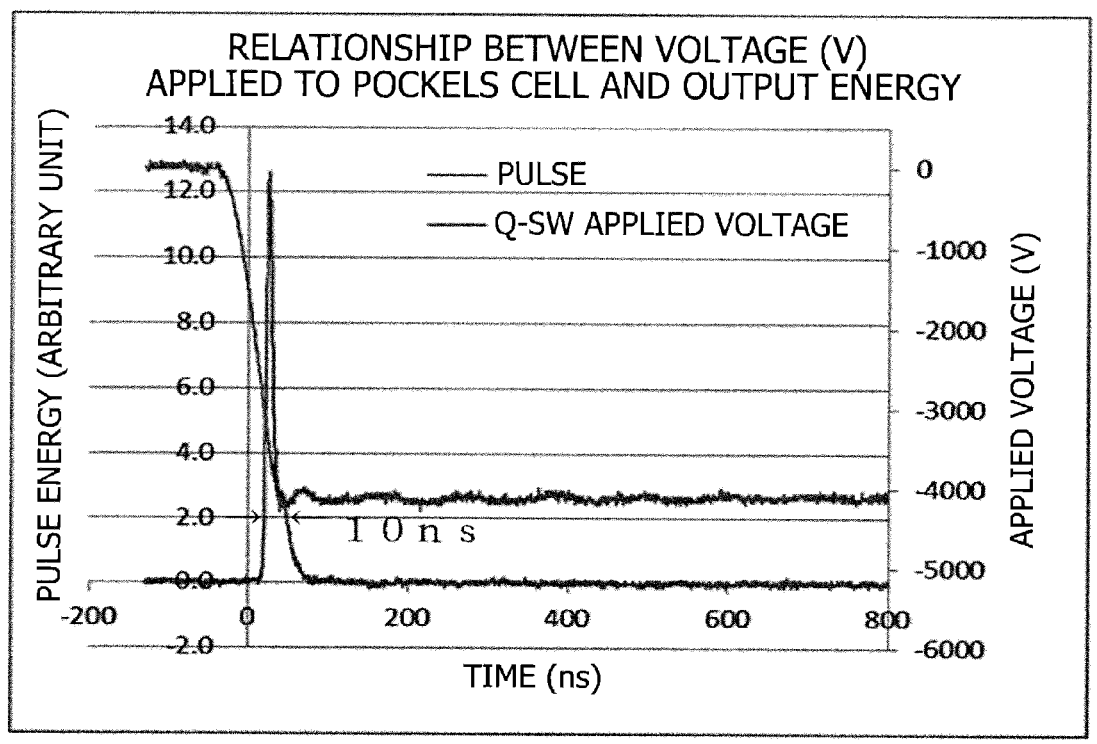
FIG. 3 is a graph illustrating one example of a relationship between a change in a voltage applied to the Pockels cell and output energy of the output pulsed laser light, according to the first embodiment.

FIG. 3 is a graph illustrating one example of a relationship between a change in a voltage applied to the Pockels cell 6 and output energy of output pulsed laser light. In the pulsed laser oscillator according to the embodiment of the present invention, when the voltage applied to the Pockels cell 6 by the voltage applying circuit 7a is changed by the control circuit 7b from approximately 0 V to approximately −4000 V in approximately 100 ns, peak energy of the pulsed laser light becomes approximately 13.0 mJ, and a pulse width becomes approximately 10 ns.

Figure 4:
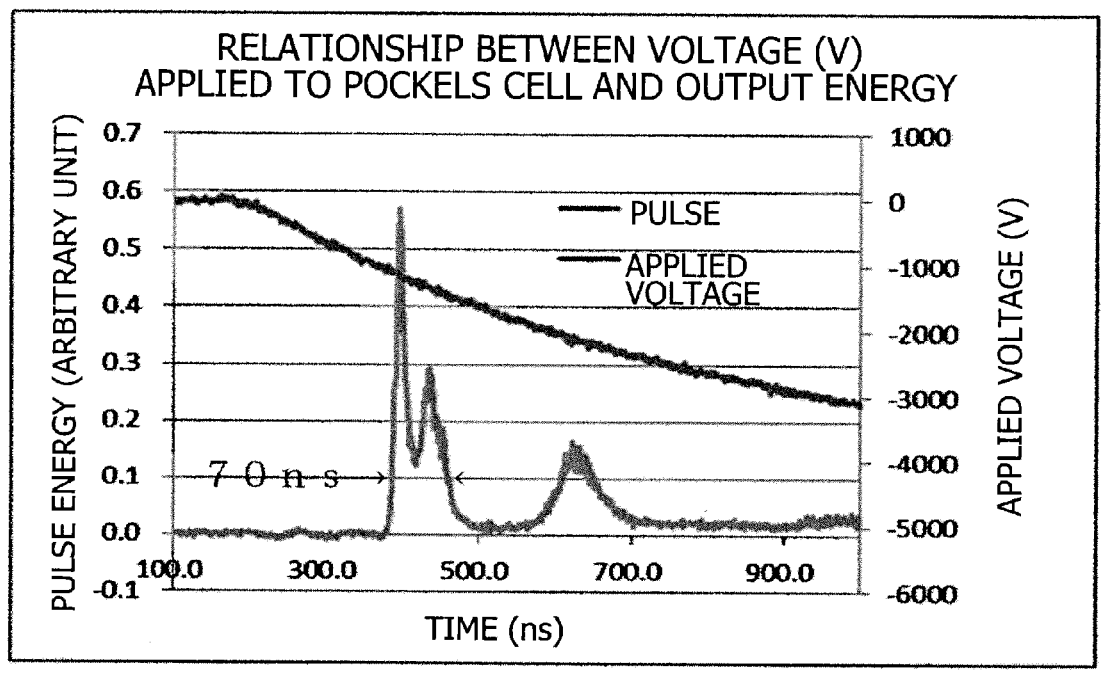
FIG. 4 is a graph illustrating another example of the relationship illustrated in FIG. 3.

Furthermore, FIG. 4 is a graph illustrating another example of the relationship between a change in a voltage applied to the Pockels cell 6 and output energy of the output pulsed laser light. In this example, the voltage applied to the Pockels cell 6 by the voltage applying circuit 7a is gradually changed by the control circuit 7b from approximately 0 V to approximately −3000 V in approximately 800 ns, compared to the example illustrated in FIG. 3. Peak energy of the pulsed laser light becomes approximately 0.6 mJ, and a pulse width becomes approximately 70 ns. Thus, by decreasing the rate of change of the voltage, which is applied by the voltage applying circuit 7a, by the control circuit 7b, the pulse width of the pulsed laser light can be increased and the peak energy thereof can be decreased.

Figure 5:
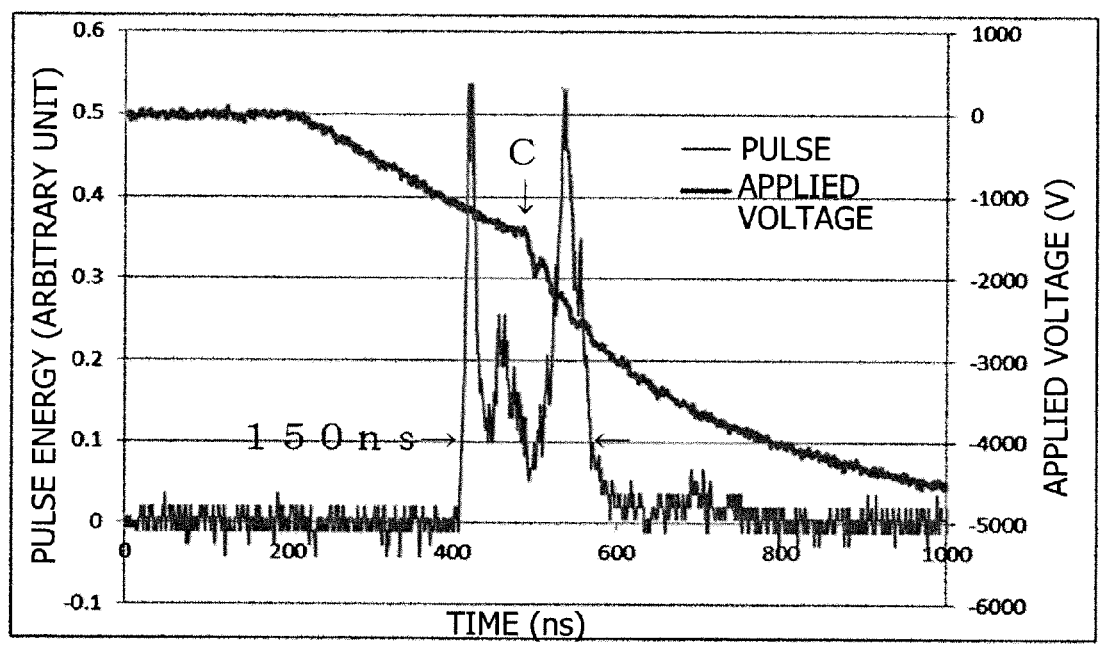
FIG. 5 is a graph illustrating further another example of the relationships illustrated in FIGS. 3 and 4.

Still further, FIG. 5 is a graph illustrating another example of the relationships between a change in a voltage applied to the Pockels cell 6 and output energy of the output pulsed laser light. In this example, the voltage applied to the Pockels cell 6 by the voltage applying circuit 7a is changed by the control circuit 7b from approximately 0 V to approximately −1500 V in approximately 300 ns, and then changed from approximately −1500 V to approximately −4500 V in approximately 600 ns.

As illustrated in FIG. 5, during the change in the voltage from approximately 0 V to approximately −1500 V and the change in the voltage from approximately −1500 V to approximately −4500 V, the rate of change of the voltage is changed once. That is, the slope of the graph of the voltage is changed near approximately −1500 V in FIG. 5. When the rate of change of the voltage is changed in such a stepwise manner, a peak can be generated after the point C at which the rate of change of the voltage is changed by the control circuit 7b (hereinafter, referred to as "control point"). In the present example, a first peak energy of the pulsed laser light is approximately 0.5 mJ to approximately 0.6 mJ, a second peak energy is also approximately 0.5 mJ to approximately 0.6 mJ, and the pulse width is approximately 150 ns. Thus, by changing the rate of change of the voltage, which is applied to the Pockels cell 6 by the voltage applying circuit 7a, by the control circuit 7b in the stepwise manner, the pulse width of the output pulsed laser light can be increased, and the peak energy of the pulsed laser light can be decreased.

The rate of change of the voltage applied by the voltage applying circuit 7a and the number of the control points C may be selected according to a required pulse width and required output energy. Furthermore, instead of the quarter-wave plate 5, a first electrooptical element which performs as a half-wave plate according to an application of voltage may be used in place of the Pockels cell 6.

FIG. 6 is a diagram illustrating a pulsed laser oscillator according to a second embodiment of the present invention. The same reference symbols are used for the components which are the same as those in the first embodiment, and differences from the first embodiment will be described hereunder.

In the second embodiment, between a quarter-wave plate 5 and a rear mirror 3b, a first Pockels cell 6a and a second Pockels cell 6b are located. These two Pockels cells 6a, 6b are first electrooptical elements which polarize light according to an applied voltage, and, as illustrated in FIG. 6, the first Pockels cell 6a and the second Pockels cell 6b are located in this order from the side of the quarter-wave plate 5 on an optical axis L on the left side of the quarter-wave plate 5. Although these two Pockels cells 6a, 6b do not polarize light in a state in which voltages are not applied thereto, the two Pockels cells 6a, 6b polarize light when voltages are applied thereto, and a degree of the polarization depends on a degree of the applied voltage.

To the first and second Pockels cells 6a, 6b, a voltage control unit 7 is electrically connected. The voltage control unit 7 applies a voltage to each of the first and second Pockels cells 6a, 6b and controls the applied voltages, and includes a first voltage applying circuit 8a, a second voltage applying circuit 8b, a first control circuit 9a and a second control circuit 9b.

The first voltage applying circuit 8a applies a voltage to the first Pockels cell 6a, and electrically connected to the first Pockels cell 6a. The first voltage applying circuit 8a is connected to the first control circuit 9a, which controls the application of voltage to the first Pockels cell 6a applied by the first voltage applying circuit 8a, to change a degree of polarization of the light which has entered the first Pockels cell 6a, thereby controlling oscillation of the laser light.

The second voltage applying circuit 8b applies a voltage to the second Pockels cell 6b, and it is electrically connected to the second Pockels cell 6b. The second voltage applying circuit 8b is connected to the second control circuit 9b, which controls the application of voltage to the second Pockels cell 6b applied by the second voltage applying circuit 8b, to change a degree of polarization of the light which has entered the second Pockels cell 6b, thereby controlling oscillation of the laser light.

Next, an operation of the pulsed laser oscillator having such a configuration according to the second embodiment, and a method of controlling the pulsed laser oscillation will be described.

To oscillate the pulsed laser by the pulsed laser oscillator, first, the first control circuit 9a and the second control circuit 9b transmit signals to the first voltage applying circuit 8a and the second voltage applying circuit 8b, respectively, to control the first and second voltage applying circuit 8a, 8b so that the voltages applied to the first Pockels cell 6a and the second Pockels cell 6b become 0 V. In this state, when the flash lamp 2 emits light and irradiates the light on the YAG rod 1, some of the atoms in the YAG rod 1 are excited, and accordingly, light is emitted from the YAG rod 1 along an optical axis L. As illustrated in FIG. 6, the light emitted from the YAG rod 1 toward a polarizer 4 (in the direction of an arrow A) enters the polarizer 4 at an incidence angle θ, which is the Brewster's angle. Among the components of the entering light, p-polarized light is transmitted through the polarizer 4, and s-polarized light and circularly (or elliptically) polarized light are reflected by the polarizer 4, thereby propagating away from the optical axis L.

The p-polarized light transmitted through the polarizer 4 enters the quarter-wave plate 5, so that the phase difference of 90° ($\pi/2$) is induced, and thus, the p-polarized light is converted to circularly polarized light, and then enters the first Pockels cell 6a. Since no voltage is applied to the first Pockels cell 6a, the incident light is transmitted therethrough without being polarized. Thus, as illustrated in FIG. 6, the circularly polarized light which has entered the first Pockels cell 6a is transmitted through the first Pockels cell 6a without being converted from the circularly polarized light. The transmitted circularly polarized light is transmitted through the second Pockels cell 6b in the same manner as described above without being converted from the circularly polarized light, and then, it is reflected by the rear mirror 3b, transmitted again though the second Pockels cell 6b and the first Pockels cell 6a, and enters the quarter-wave plate 5.

When the circularly polarized light enters the quarter-wave plate 5, an additional phase difference of 90° ($\pi/2$) is induced, and accordingly, the circularly polarized light is converted to s-polarized light (that is, in a state in which the phase thereof is shifted by 180° ($\pi$) with respect to the p-polarized light emitted from the YAG rod 1 and transmitted through the polarizer 4), and then, enters the polarizer 4 at an incidence angle θ, which is the Brewster's angle. Since the polarizer 4 has the function of reflecting the s-polarized light as mentioned above, the s-polarized light which has entered is reflected by the polarizer 4 and propagates away from the optical axis L.

Thus, in a state in which the first and second Pockels cells 6a, 6b are not applied with voltages, the light emitted from the YAG rod 1 might be reflected by the polarizer 4, so that the light cannot enter again the YAG rod 1, and thus, oscillation does not occur in the optical resonator 3, so that oscillation of the pulsed laser is suppressed.

Next, after this state in which voltages are not applied is maintained until the number of atoms excited in the YAG rod 1 reaches a number which is required to output desired energy as the pulsed laser light (until population inversion becomes sufficiently large), the first and second control circuits 9a, 9b make voltages applied to the first and second Pockels cells 6a, 6b by the first and second voltage applying circuits 8a, 8b change. When the first and second Pockels cells 6a, 6b are applied with voltages by the first and second voltage applying circuits 8a, 8b, the first and second Pockels cells 6a, 6b polarize light according the applied voltages. When predetermined voltages are applied to each of these two Pockels cells 6a, 6b, the two Pockels cells 6a, 6b perform as the quarter-wave plate as a whole. A degree, direction, and a changing timing of the voltages applied to the two Pockels cells 6a, 6b may be controlled to be the same, or alternatively, controlled to be different from each other, by the first and second control circuits 9a, 9b.

In a state in which the first and second Pockels cells 6a, 6b are applied with voltages, among the components of the light emitted from the YAG rod 1 toward the polarizer 4 (in the direction of the arrow A), only the p-polarized light is transmitted through the polarizer 4, and the s-polarized light and the circularly (or elliptically) polarized light are reflected by the polarizer 4, as illustrated in FIG. 7, in the same manner as in the state in which voltages are not applied. The p-polarized light transmitted through the polarizer 4 is converted to circularly polarized light by the quarter-wave plate 5, and enters the first and second Pockels cells 6a, 6b. Since the first and second Pockels cells 6a, 6b perform as the quarter-wave plate as a whole by being applied with the voltages, the circularly polarized light which has entered the first and second Pockels cells 6a, 6b is transmitted therethrough, and thus, the phase difference of 90° ($\pi/2$) is induced, so that the circularly polarized light is converted to s-polarized light (that is, in a state in which the phase thereof is shifted by 180° ($\pi$) with respect to the p-polarized light emitted from the YAG rod 1 and transmitted through the polarizer 4).

This s-polarized light is reflected by the rear mirror 3b and enters the second Pockels cell 6b and the first Pockels cell 6a again, and accordingly, an additional phase difference of 90° is induced, so that the s-polarized light is converted to circularly polarized light (that is, in a state in which the phase thereof is shifted by 270° ($3\pi/2$) with respect to the p-polarized light emitted from the YAG rod 1 and transmitted through the polarizer 4). This circularly polarized light enters the quarter-wave plate 5, and accordingly, an additional phase difference of 90° is induced, so that the circularly polarized light is converted to p-polarized light (that is, in a state in which the phase thereof is shifted by 360° ($2\pi$) with respect to the p-polarized light emitted from the YAG rod 1 and transmitted through the polarizer 4).

This p-polarized light enters the polarizer 4 at an incidence angle $\theta$, which is the Brewster's angle, and it is then transmitted through the polarizer 4. The light transmitted through the polarizer 4 enters the YAG rod 1 from the left side thereof in FIG. 7, to cause the stimulated emission in the YAG rod 1, and then the light is emitted from the right side of the YAG rod 1 in FIG. 7. The light is then reflected by the front mirror 3a, and travels through the YAG rod 1 from the right side to the left side in FIG. 7. The light reciprocates in the optical resonator 3 in the same manner thereafter, and thus, some of the coherent light, which is amplified by the stimulated emission, is output as a laser in a direction of an arrow B from the front mirror 3a.

When only the voltage applied to the first Pockels cell 6a by the first voltage applying circuit 8a is changed by the control circuit 9a (the second Pockels cell 6b is not applied with a voltage) from approximately 0 V to approximately −4000 V in approximately 100 ns, as illustrated in FIG. 3, peak energy of the pulsed laser light becomes approximately 13.0 mJ, and a pulse width becomes approximately 10 ns.

Furthermore, when a total voltage applied to the first Pockels cell 6a by the first voltage applying circuit 8a is gradually changed by the first control circuit 9a from approximately 0 V to approximately −3000 V in approximately 800 ns, compared to the example illustrated in FIG. 3, as illustrated in FIG. 4, peak energy of the pulsed laser light becomes approximately 0.6 mJ, and a pulse width becomes approximately 70 ns. Thus, by decreasing the rate of change of the voltage, which is applied by the first voltage applying circuit 8a, by the first control circuit 9a, the pulse width of the pulsed laser light can be increased and the peak energy thereof can be decreased. This is also applied to a case in which only the second Pockels cell 6b is applied with a voltage (the first Pockels cell 6a is not applied with a voltage). Furthermore, this is also applied to a case in which both the first and second Pockels cells 6a, 6b are applied with voltages. Thus, by changing the voltage, which is applied to the first and second Pockels cells 6a, 6b, by the first and second control circuits 9a, 9b, the pulse width of the pulsed laser light can be increased and the peak energy of the pulsed laser light can be decreased.

Furthermore, as illustrated in FIG. 5, the voltage applied to the first Pockels cell 6a by the first voltage applying circuit 8a may be changed by the first control circuit 9a from approximately 0 V to approximately −1500 V in approximately 300 ns, and then changed from approximately −1500 V to approximately −4500 V in 600 ns.

In FIG. 5, during the change in the voltage from approximately 0 V to approximately −1500 V and the change in the voltage from approximately −1500 V to approximately −4500 V, the rate of change of the voltage is changed once. That is, the slope of the graph of the voltage is changed near approximately −1500 V in FIG. 5. When the rate of change of the voltage is changed in such a stepwise manner, a peak can be generated after the control point C at which the rate of change of the voltage is changed by the first control circuit 9a. In the present example, a first peak energy of the pulsed laser light is approximately 0.5 mJ to approximately 0.6 mJ, a second peak energy is also approximately 0.5 mJ to approximately 0.6 mJ, and the pulse width is approximately 150 ns.

Thus, by changing the rate of change of the voltage, which is applied to the first Pockels cell 6a by the first voltage applying circuit 8a, by the first control circuit 9a in the stepwise manner, the pulse width of the output pulsed laser light can be increased, and the peak energy of the pulsed laser light can be decreased. This is also applied to a case in which only the second Pockels cell 6b is applied with a voltage (the first Pockels cell 6a is not applied with a voltage). Furthermore, this is also applied to a case in which both the first and second Pockels cells 6a, 6b are applied with voltages. Thus, by changing the rates of change of the voltages, which are applied to the first and second Pockels cells 6a, 6b by the first and second voltage applying circuits 8a, 8b, by the first and second control circuits 9a, 9b in a stepwise manner, the pulse width of the output pulsed laser light can be increased, and the peak energy of the pulsed laser light can be decreased.

The number of the control points C may be selected according to a desired pulse width and desired peak energy as appropriate.

Figure 8A:
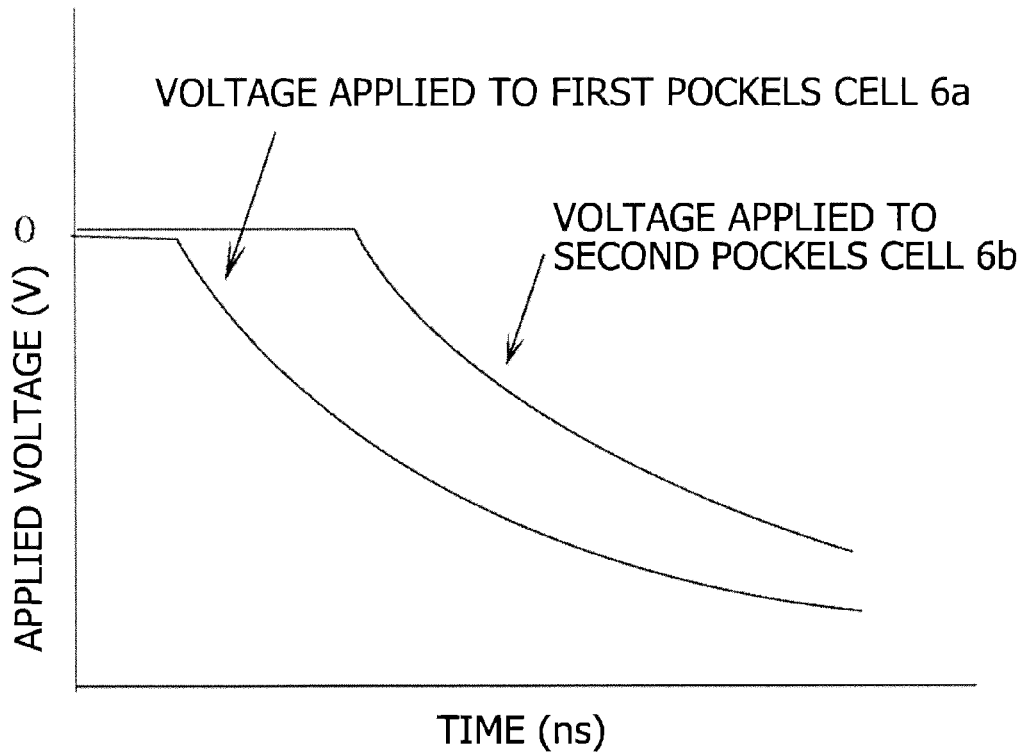
Figure 8B:
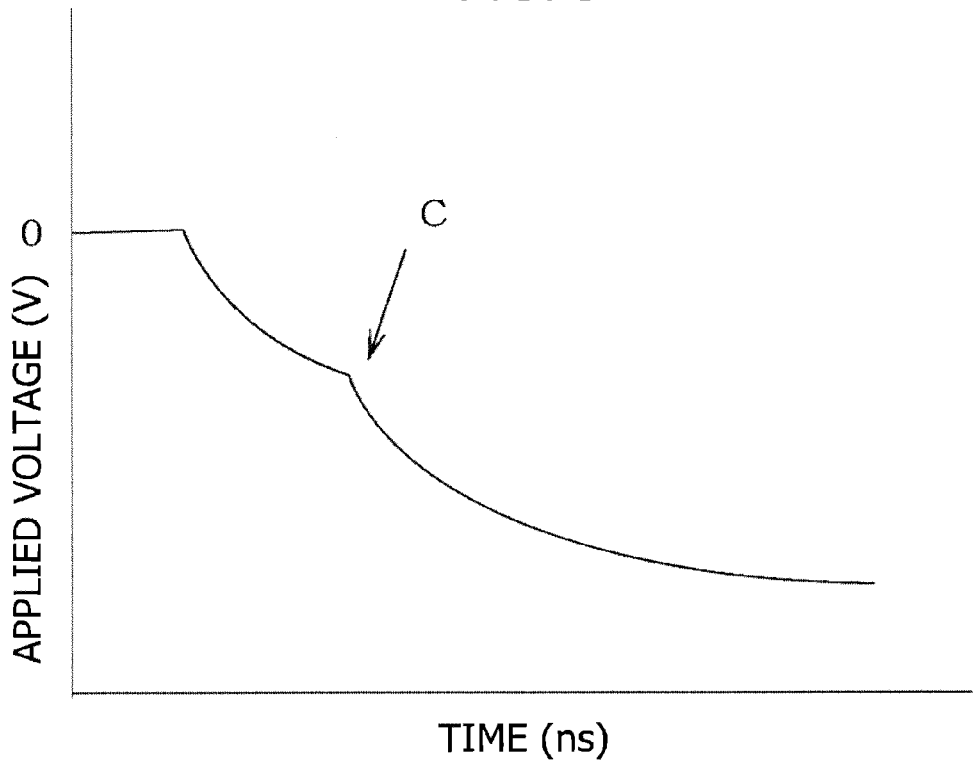

FIGS. 8A and 8B are graphs schematically illustrating control of voltages applied to two Pockels cells 6a, 6b. As illustrated in FIG. 8A, by controlling a voltage applied to the first Pockels cell 6a by the first control circuit 9a, and by controlling a voltage applied to the second Pockels cell 6b by the second control circuit 9b, timings of applying the voltages to these two Pockels cells 6a, 6b can be shifted from each other. Thus, such control of shifting the timings of applying the voltages applied to the two Pockels cells 6a, 6b corresponds, as a whole of the two Pockels cells 6a, 6b, to control of changing once in the stepwise manner the rate of change of the total applied voltage applied to the two Pockels cells 6a, 6b (including one control point C), as illustrated in FIG. 8B. That is, by shifting the timings of applying the voltages to the two Pockels cells 6a, 6b, the pulse width of the output pulsed laser light can be increased and the peak energy of the pulsed laser light can be decreased, in the same manner as in the case in which the rate of change of the voltage applied to one of the Pockels cells is changed in the stepwise manner. In this state, it is not necessary to change the rates of change of the voltages applied to the first and second Pockels cells 6a, 6b by the first and second control circuits 9a, 9b in the stepwise manner, control can be easier. Thus, a control circuit with a simple structure can be used.

Figure 9A:
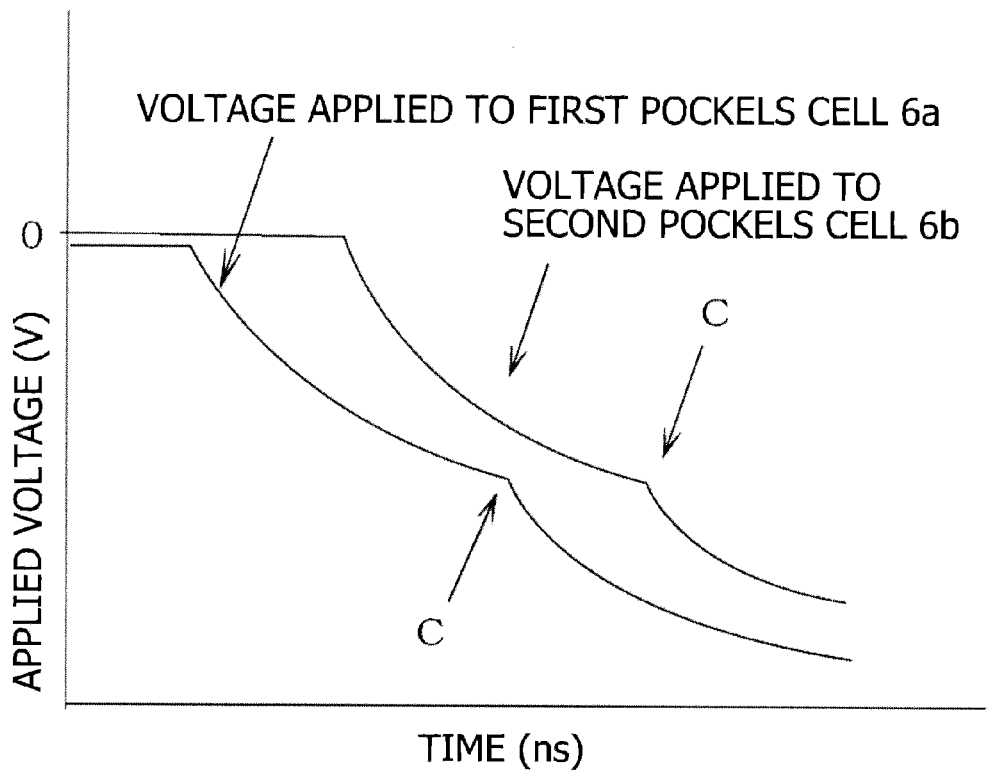
FIGS. 9A and 9B are graphs illustrating another example of the control of the voltage illustrated in FIGS. 8A and 8B.
Figure 9B:
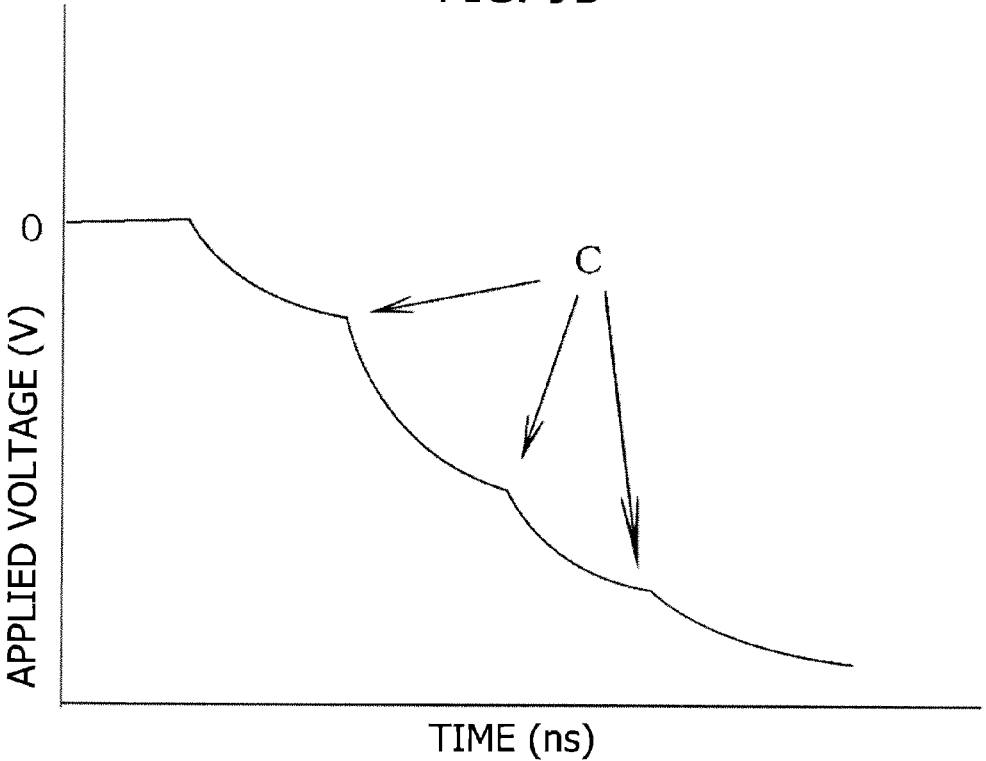

Furthermore, as illustrated in FIG. 9A, while the timings of applying the voltages applied to the first and second Pockels cells 6a, 6b are shifted, each of the rates of change of the applied voltages may be changed in a stepwise manner. Such control of voltages in which the timings of applying the voltages to the two Pockels cells 6a, 6b are shifted and the rates of change of the applied voltages are changed in the stepwise manner, corresponds, as a whole of the two Pockels cells 6a, 6b, to control of voltage in which the rate of change is changed three times in a stepwise manner (including three control points C) as illustrated in FIG. 9B in one of the first and second Pockels cells 6a, 6b.

Figure 10A:
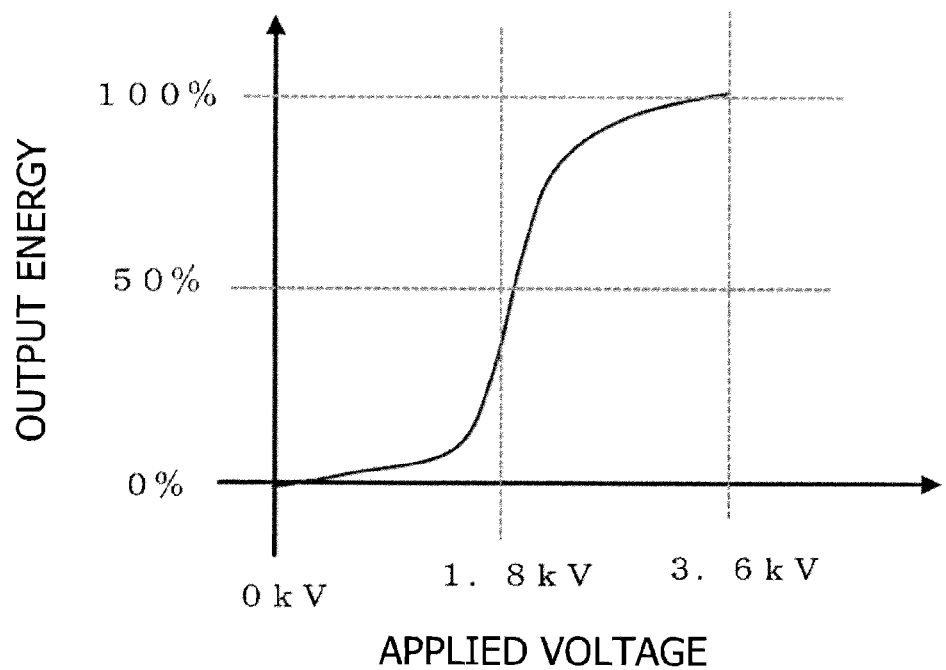
Figure 10B:
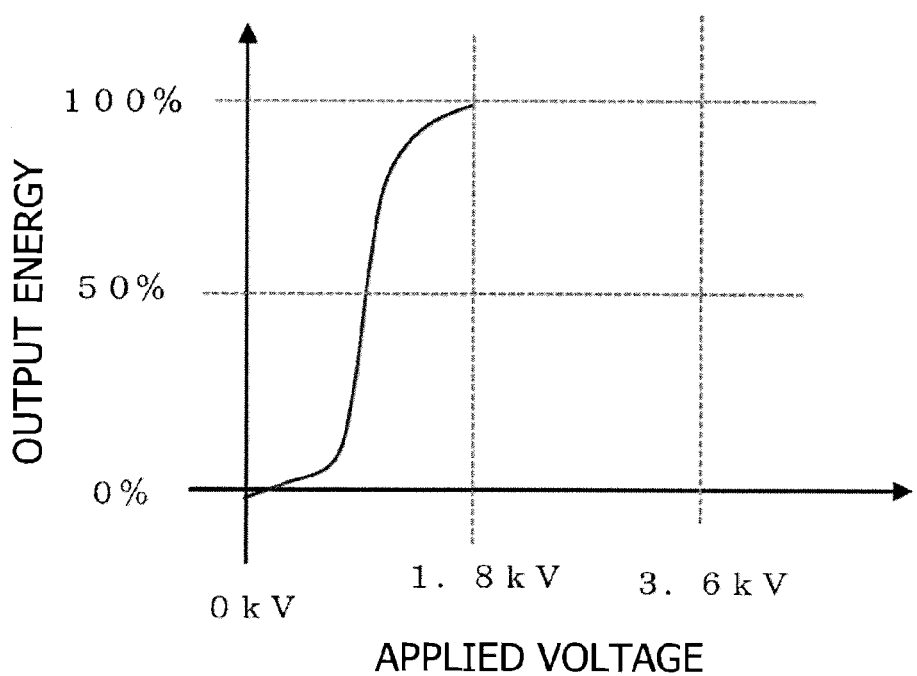
Figure 11:
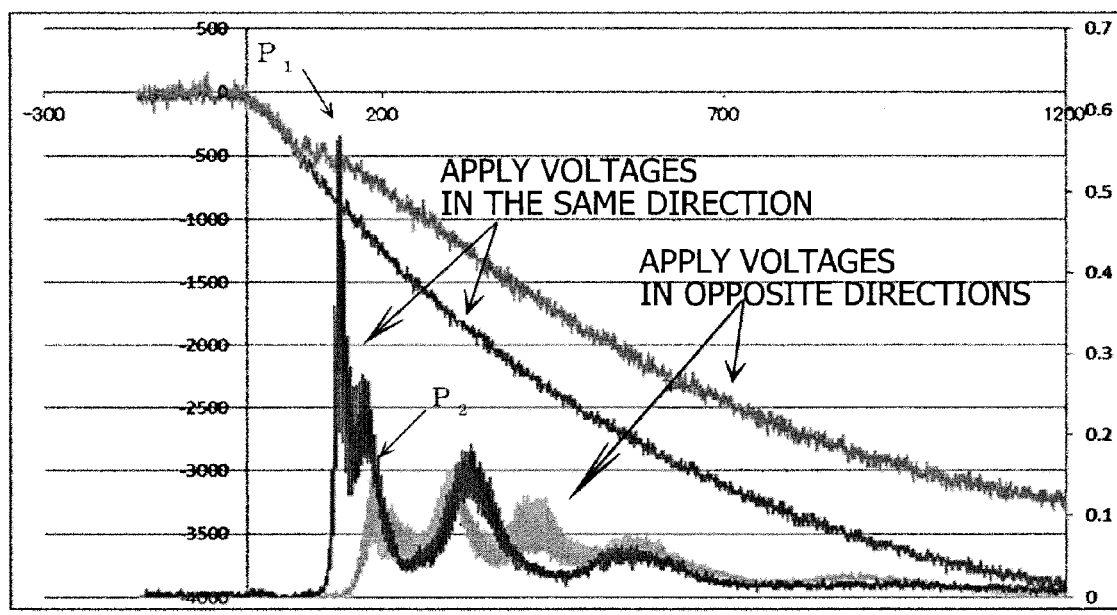
FIG. 11 is a graph comparing the output energy of the output pulsed laser light in the state in which the two Pockels cells according to the second embodiment are applied with the voltages in the same direction and those in a state in which the two Pockels cells are applied with voltages in opposite directions.

As illustrated in FIGS. 10A, 10B and 11, when the two Pockels cells 6a, 6b are applied with voltages, directions of which are the same, each of the two Pockels cells 6a, 6b is applied with a voltage lower than a voltage required to let one of the Pockels cells perform as the quarter-wave plate by being applied with the voltage, so that the two Pockels cells 6a, 6b can perform as the quarter-wave plate as a whole.

For example, when both first and second Pockels cells 6a, 6b are Pockels cells that perform as the quarter-wave plate by being applied with a voltage of 3.6 kV, and when only one of the Pockels cells is applied with a voltage (the other Pockels cell is not applied with a voltage), output energy of the pulsed laser light can be 100% by being applied with a voltage of 3.6 kV, as illustrated in FIG. 10A, since it is necessary to make the one Pockels cell performs as the quarter-wave plate. In contrast, when the two Pockels cells 6a, 6b are applied with voltages in the same direction and degree, output energy of the pulsed laser light can be 100% by being applied with voltages of only 1.8 kV, as illustrated in FIG. 10B, since this can be achieved by making the two Pockets cells 6a, 6b perform as the quarter-wave plate as a whole. That is, when the two Pockels cells 6a, 6b are applied with the voltages in the same direction, the voltages required to obtain 100% of output energy of the pulsed laser light can be decreased.

Furthermore, the first and second Pockels cells 6a, 6b may be applied with voltages in directions opposite to each other. As illustrated in FIG. 11, peak energy of a first peak $P_1$ is approximately 0.6 mJ when the two Pockels cells 6a, 6b are applied with voltages in the same direction, while peak energy of a first peak $P_2$ is approximately 0.2 mJ when the two Pockels cells 6a, 6b are applied with voltages in directions opposite to each other by shifting the changing timings of voltage. That is, when the changing timings of voltage are shifted from each other and voltages are applied in the directions opposite to each other, the peak energy of the first peak can be decreased.

In the present embodiment, the Pockels cells which perform as the quarter-wave plate by being applied with voltages are used as the first and second Pockels cells 6a, 6b. However, the two Pockels cells 6a, 6b may be any components which perform as the quarter-wave plate as a whole by being applied with voltages, and thus, Pockels cells which perform as half-wave plates by being applied with voltages, or electrooptical elements other than the Pockels cells, for example, may be used.

Furthermore, while one Pockels cell is applied with a predetermined voltage to perform as the quarter-wave plate, a voltage applied to the other Pockels cell may be changed, or alternatively, the two Pockels cells 6a, 6b may be applied with predetermined voltages to perform as the half-wave plate as a whole, to thereby control oscillation of the pulsed laser. In this case, the quarter-wave plate 5 may be unnecessary, and accordingly, the number of the components of the pulsed laser may be decreased.

Thus, according to the first and second embodiments, the voltage control unit can change over time a voltage value applied to the first electrooptical element, to control the pulse width of the laser light. Thus, the pulse width of the output pulsed laser light can be increased, and the peak energy of the pulsed laser light can be decreased.

Furthermore, the pulse width can be increased without using a beam splitter that separates laser light or a mirror for an optical duration system, a more compact pulsed laser oscillator can be provided.

Still further, when using the pulsed laser oscillator, it is not necessary to adjust the beam splitter or the mirror for the optical duration system, and accordingly, an operation for using the pulsed laser oscillator can be easier.

Yet further, by changing the rate of change of the voltage applied to the electrooptical element in the stepwise manner, laser light with a longer pulse having an increased pulse width can be generated, and the peak energy of the pulsed laser light can be decreased.

Figure 12:
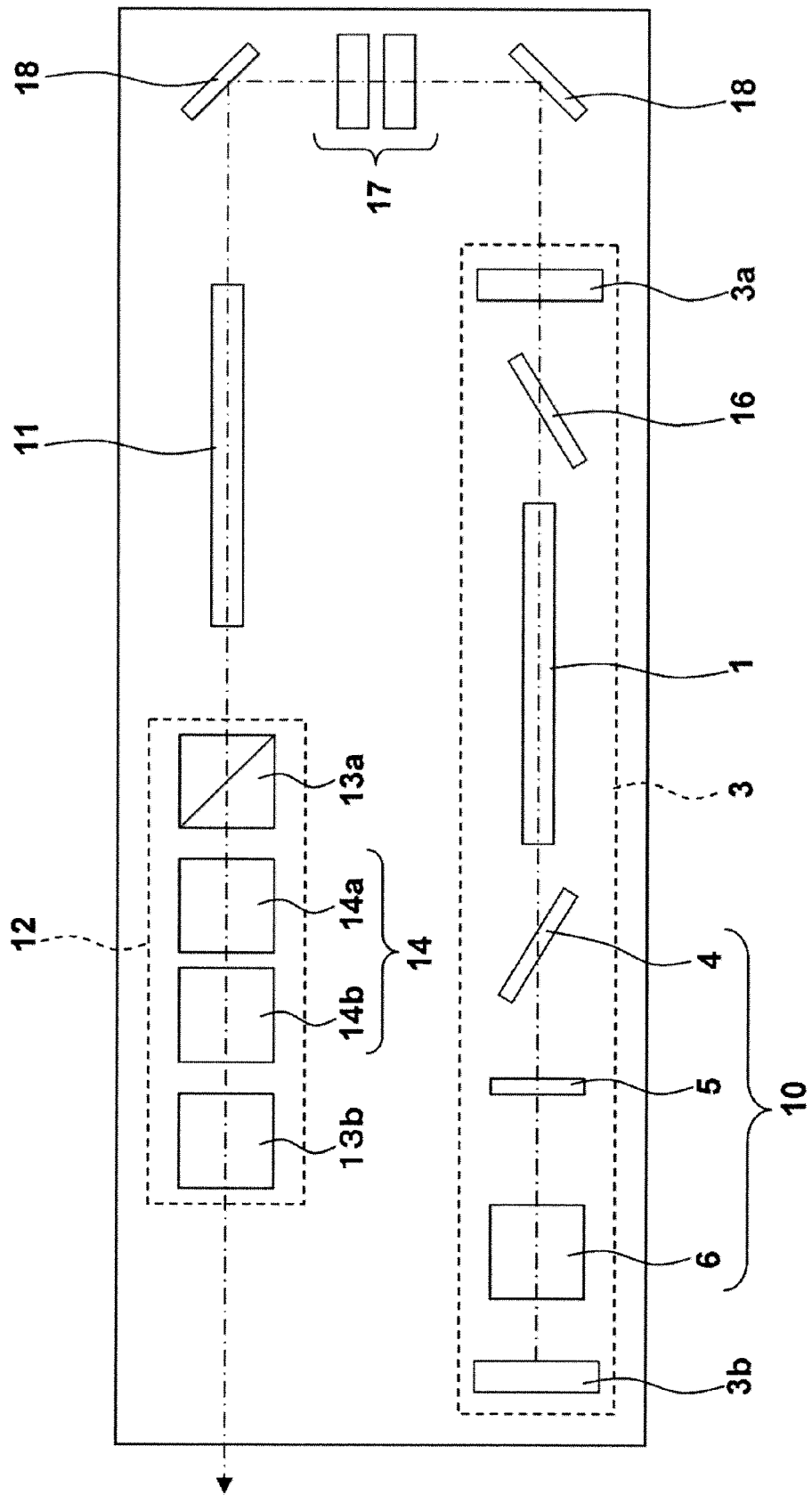
FIG. 12 is a plan view illustrating a pulsed laser oscillator according to a third embodiment of the present invention.

FIG. 12 is a plan view illustrating a pulsed laser oscillator according to a third embodiment of the present invention. The same reference symbols are used for the components which are the same as those in the first embodiment, and differences from the first embodiment will be described hereunder.

In the third embodiment, a resonator 3, an optical amplifier 11 and a laser attenuator 12 are located, in this order, from the upstream to the downstream in the laser light advancing direction.

The resonator 3 has the same function as that of the resonator according to the first embodiment, and includes, between a front mirror 3a and a rear mirror 3b, a laser medium that emits laser light by being excited by a flash lamp (not shown), such as a ND:YAG rod 1, a polarizer 4 as a polarizing element located behind the ND:YAG rod 1, a quarter-wave plate 5, and a Q switch 10 including a Pockels cell 6.

In this embodiment, by controlling a voltage applied to the Pockels cell 6 by controlling means (not shown) in the same manner as in the first embodiment, a pulse width of the pulsed laser light can be increased.

The optical amplifier 11 amplifies the pulse energy of the laser light to output the laser light, and a ND:YAG rod, for example, may be used.

Furthermore, the laser attenuator 12 selectively decreases energy of the laser light at one pulse during a certain time.

Figure 13:
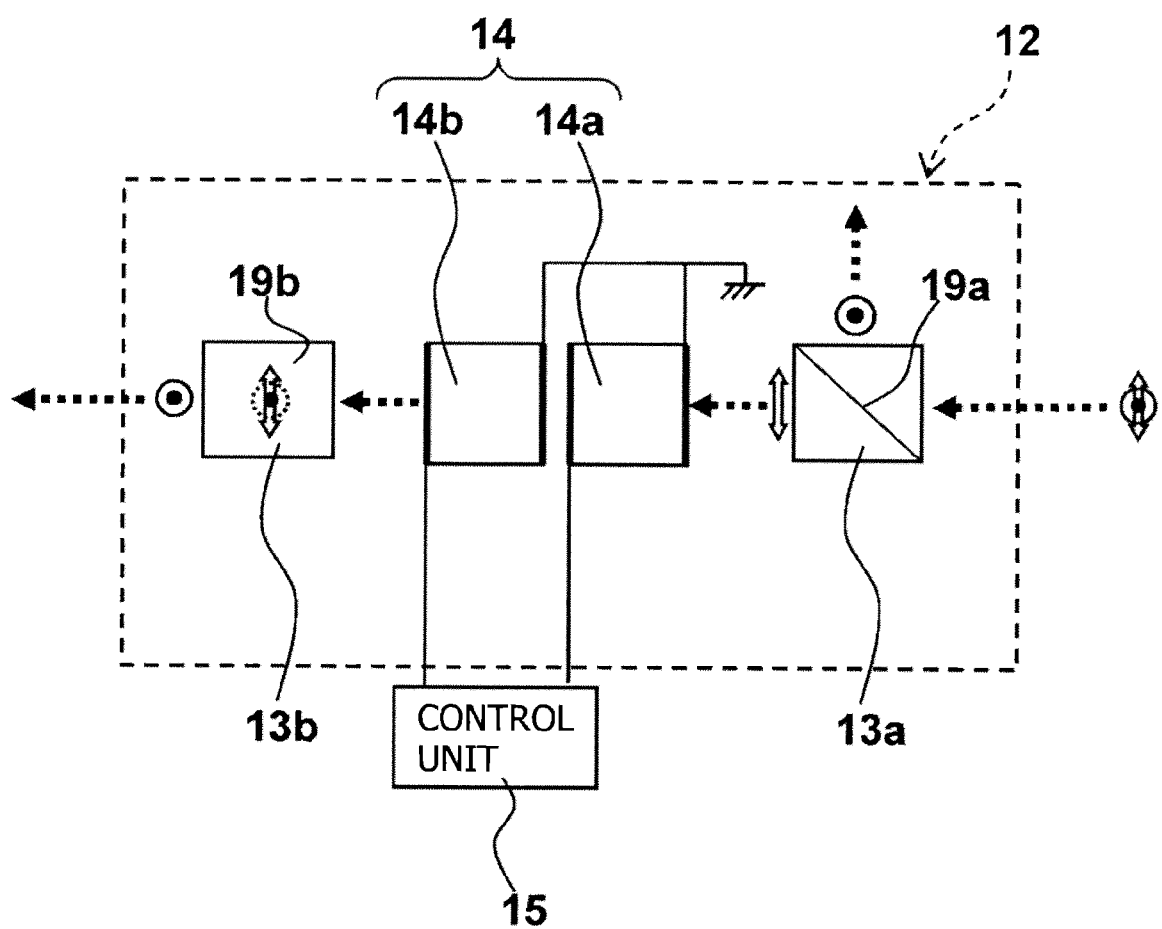
FIG. 13 is a plan view illustrating one configuration example of a laser attenuator according to the third embodiment.

As illustrated in FIG. 13, a specific configuration example of the laser attenuator 12 includes: first and second polarizing beam splitters 13a, 13b which are located in a crossed Nicols arrangement on an optical path of the laser light as polarizing elements; Pockels cells 14 which are located between the first and second polarizing beam splitters 13a, 13b and located so that an optical axis becomes 45° with respect to incidence linearly polarized light (for example, p-polarized light) and which rotates a plane of polarization of laser light passes therethrough by being applied with a voltage as a second electrooptical element; and a control unit 15 which controls a voltage value applied to the Pockels cells 14 and an applying timing thereof.

The Pockels cells 14 used in the third embodiment may perform as a quarter-wave plate by being applied with a voltage of −3.6 kV, as an example. When third and fourth Pockels cells 14a, 14b are arranged in series and parallel-controlled by being applied with voltages of −3.6 kV, the combination of the third and fourth Pockels cells 14a, 14b performs as a half-wave plate. In this case, when voltages applied to the third and fourth Pockels cells 14a, 14b is changed from 0 kV to −3.6 kV, for example, an optical transmittance of the laser attenuator 12 may change from 0% to 100%.

In FIG. 12, the reference symbol 16 is a second polarizer, the reference symbol 17 is a beam expander which expands the diameter of the laser beam, and the reference symbol 18 is a reflection mirror.

Next, an operation of the third embodiment having such a configuration, in particular, an operation of the laser attenuator 12 will be described.

First, a case in which the laser attenuator 12 transmits 100% of the laser light will be described. In this case, each of the third and fourth Pockels cells 14a, 14b of the laser attenuator 12 is applied with a voltage of −3.6 kV.

In this case, first, laser light which has entered the laser attenuator 12 is split at a reflection plane 19a of the first polarizing beam splitter 13a, into linearly polarized light (p-polarized light) having a plane of polarization parallel to an incidence plane to the reflection plane 19a and transmitting the reflection plane 19a, and linearly polarized light (s-polarized light) having a plane of polarization perpendicular to the incidence plane and reflected by the reflection plane 19a.

The p-polarized light transmitting through the first polarizing beam splitter 13a enters the third Pockels cell 14a. In this case, the third Pockels cell 14a performs as the quarter-wave plate by being applied with a voltage of −3.6 kV Thus, during travelling through the third Pockels cell 14a, a phase difference of 90° is induced to the laser light of the p-polarized light which has entered the third Pockels cell 14a, and thus, the laser light is converted to circularly polarized light and then radiated from the third Pockels cell 14a.

Then, the circularly polarized light enters the fourth Pockels cell 14b. Since the fourth Pockels cell 14b is also applied with a voltage of −3.6 kV, the fourth Pockels cell performs as the quarter-wave plate. Thus, during travelling through the fourth Pockels cell 14b, an additional phase difference of 90° is induced to the laser light of the circularly polarized light which has entered the fourth Pockels cell 14b. Accordingly, the p-polarized light transmitting through the first polarizing beam splitter 13a enters the second polarizing beam splitter 13b in a state in which the plane of polarization thereof is rotated by 90° by the third and fourth Pockels cells 14a, 14b.

Since the first and second polarizing beam splitter 13a, 13b are located in a crossed Nicols arrangement, the relation between reflection planes 19a, 19b of polarizing beam splitters 13a, 13b is that one plane is rotated about the optical axis by 90° from the other plane. Thus, the linearly polarized light which has entered the second polarizing beam splitter 13b becomes the p-polarized-light relationship with respect to the reflection plane 19b of the second polarizing beam splitter 13b, and accordingly, it is transmitted through the reflection plane 19b.

In contrast, when the third and fourth Pockels cells 14a, 14b are not applied with voltages, the plane of polarization of the linearly polarized light travelling through the Pockels cells 14 is not rotated, and thus, the p-polarized light transmitted through the first polarizing beam splitter 13a enters the second polarizing beam splitter 13b without being converted. In this case, the p-polarized light becomes the s-polarized-light relationship with respect to the reflection plane 19b of the second polarizing beam splitter 13b, and thus, the light is reflected upward (or downward) from the plane of FIG. 13 at the reflection plane 19b and absorbed by a light absorption material (not shown), and accordingly, the p-polarized light is not emitted from the laser attenuator 12.

Thus, by appropriately changing the voltage applied to the third and fourth Pockels cells 14a, 14b in a range between 0 kV and −3.6 kV, to rotate the plane of polarization of the linearly polarized light travelling through the Pockels cells 14, so as to draw out polarization components having the p-polarized-light relationship with respect to the reflection plane 19b of the second polarizing beam splitter 13b, energy intensity of the laser light output from the laser attenuator 12 can be adjusted between 0% and 100%.

The pulsed laser oscillator according to the embodiment of the present application can increase the pulse width of the generated laser light as illustrated in FIG. 4 or 5, for example, by controlling the voltage applied to the Pockels cell 6 of the Q switch 10 to be gradually decreased. However, the longer pulsed laser light generated thereby outputs excess pulse energy during a certain time, and thus, uniform annealing might be prevented when amorphous silicon of a semiconductor substrate is subjected to annealing to change the amorphous silicon into polysilicon, for example.

Thus, in the pulsed laser oscillator according to the embodiment of the present invention, the voltage value applied to the Pockels cells 14 of the laser attenuator 12 and the applying timing thereof are controlled so that the pulse energy of the one pulse of the laser light during the certain time can be selectively decreased to achieve an even laser energy in one pulse. Hereunder, such an operation of the laser attenuator 12 will be described.

Figure 14A:
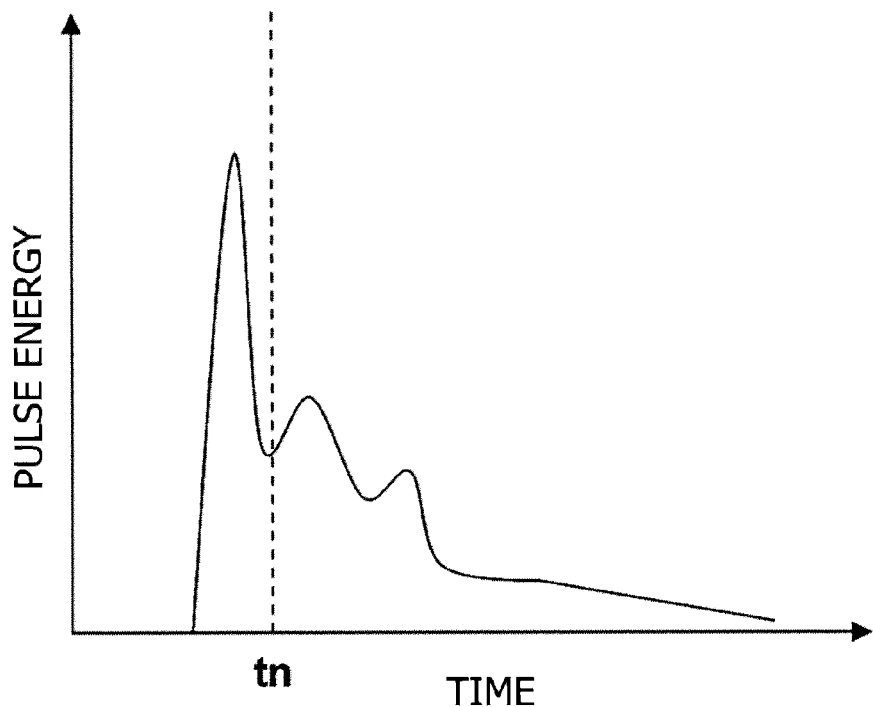
Figure 15A:
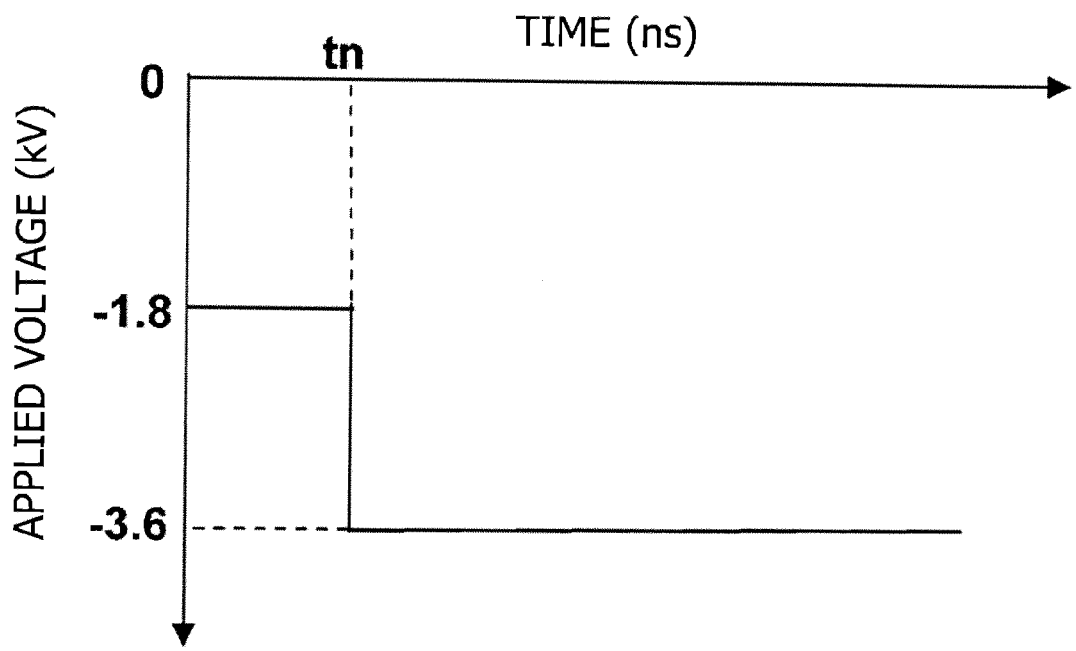

When the laser light with a longer pulse, which outputs excess pulse energy before a time tn as illustrated in FIG. 14A, enters the laser attenuator 12, the pulse energy can be decreased by 50%, for example, by controlling voltages applied to the third and fourth Pockels cells 14a, 14b to be −1.8 kV before the time tn, and to be −3.6 kV after the time tn, as illustrated in FIG. 15A.

Figure 14B:
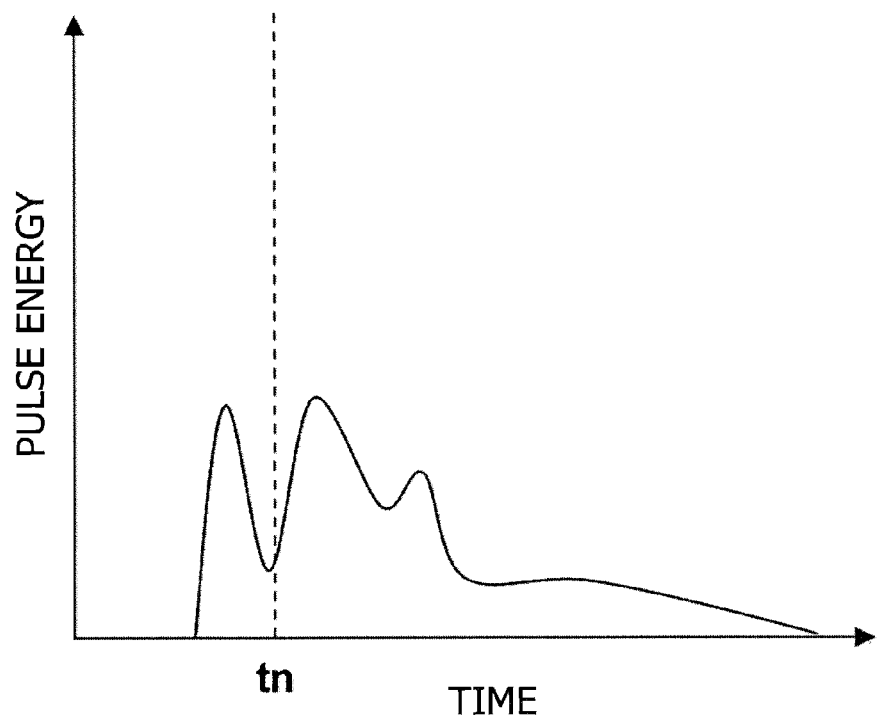
Figure 15B:
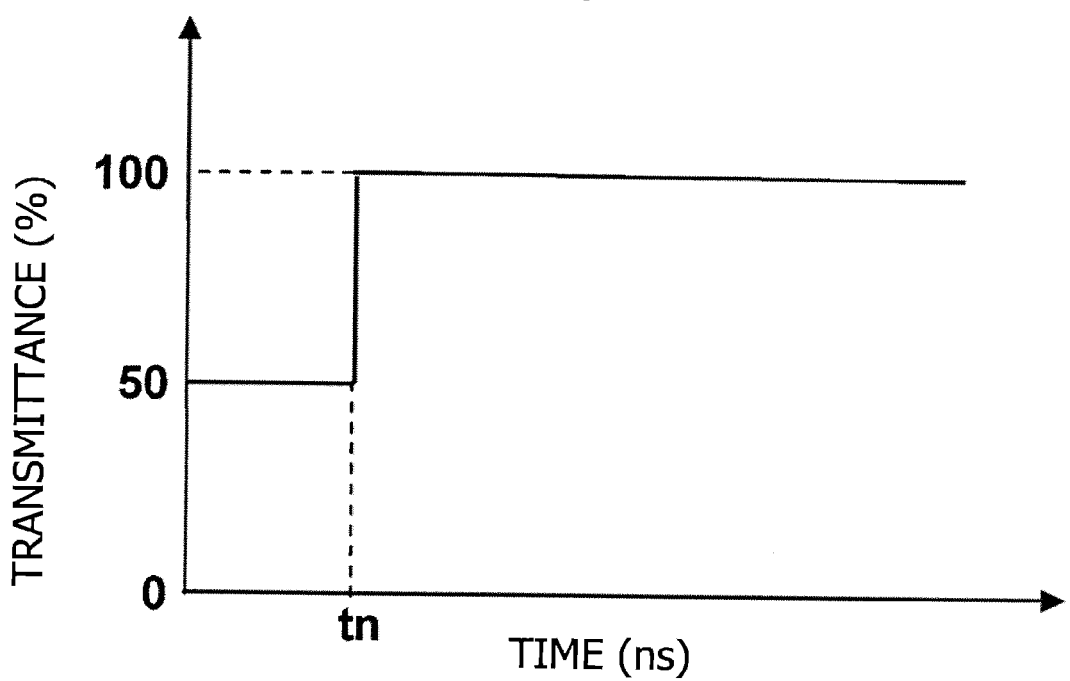

Thus, as illustrated in FIG. 15B, the transmittance of the laser light transmitted through the laser attenuator 12 is decreased by 50% before the first time tn, and the transmittance becomes 100% after the time tn. Therefore, the laser intensity of the laser light with the longer pulse as illustrated in FIG. 14A is decreased by 50% before the first time tn and the original intensity before being decreased is maintained after the time tn. As a result, as illustrated in FIG. 14B, the laser intensity in one pulse becomes substantially even.

Thus, according to the third embodiment, the excess energy of the longer pulsed laser light during the certain time can be selectively decreased. Therefore, substantially even energy can be achieved over the entire pulse width. Accordingly, when the laser light is used in the processing, a workpiece can be prevented from being damaged, such as by burnout, caused by local concentration of excess energy.

In the third embodiment, the laser attenuator 12 is provided with the third and fourth Pockels cells 14a, 14b; however, one electrooptical element that performs as the half-wave plate by being applied with a voltage may be alternatively used.

Furthermore, in the third embodiment, the laser attenuator 12 is located at the downstream of the optical amplifier 11, but the present invention is not limited thereto, and the laser attenuator 12 may be located at the upstream of the optical amplifier 11. However, when the laser attenuator 12 is located at the upstream of the optical amplifier 11, noise may be amplified together with the laser energy decreased during the selected certain time by the following optical amplifier 11, and accordingly, the signal-to-noise ratio may become worse. Thus, as in the third embodiment, disposing the laser attenuator 12 on the downstream of the optical amplifier 11 is preferable. Alternatively, the laser attenuator 12 may be located so that energy of the laser light emitted from the pulsed laser oscillator can be decreased.

Furthermore, the pulsed laser oscillator according to the embodiment of the present invention may be used in not only the annealing, but any laser machining, such as boring.

It should be noted that the entire contents of Japanese Patent Applications No. 2011-153283 (filed on Jul. 11, 2011), No. 2011-155734 (filed on Jul. 14, 2011) and No. 2011-155735 (filed on Jul. 14, 2011), on which convention priorities are claimed, are incorporated herein by reference.

It should also be understood that many modifications and variations of the described embodiments of the invention will be apparent to a person having ordinary skill in the art, without departing from the spirit and scope of the present invention as claimed in the appended claims.

What is claimed is:

1. A pulsed laser oscillator comprising: at least one first electrooptical element that polarizes light according to an applied voltage; and a voltage control unit that applies a voltage to the first electrooptical element and controls the voltage,
wherein the voltage control unit changes over time a voltage value applied to the first electrooptical element, to increase a pulse width of laser light which has passed through the first electrooptical element.

2. The pulsed laser oscillator according to claim 1, wherein at least one first electrooptical element is a plurality of first electrooptical elements, and each voltage value applied to each of the plurality of first electrooptical elements is changed over time.

3. The pulsed laser oscillator according to claim 1, wherein the voltage control unit changes in a stepwise manner a rate of change of the voltage value applied to the first electrooptical element.

4. The pulsed laser oscillator according to claim 2, wherein the plurality of first electrooptical elements is two first electrooptical elements, and each of the two first electrooptical elements is applied with a voltage in directions opposite to each other by the voltage control unit.

5. The pulsed laser oscillator according to claim 1, wherein at least one first electrooptical element is at least one Pockels cell, the pulsed laser oscillator further comprising a quarter-wave plate.

6. The pulsed laser oscillator according to claim 1, further comprising, on an optical path of the laser light, a laser attenuator comprising: two polarizing elements located in a crossed Nicols arrangement; at least one second electrooptical element that is located between the two polarizing elements and that rotates a plane of polarization of laser light passes therethrough by being applied with a voltage; and a control unit that controls a voltage value applied to the second electrooptical element and an applying timing thereof.

7. The pulsed laser oscillator according to claim 6, wherein at least one second electrooptical element is at least one Pockels cell.

8. The pulsed laser oscillator according to claim 7, wherein a plurality of the Pockels cells are arranged in series.

9. The pulsed laser oscillator according to claim 6, wherein the laser attenuator is located at a downstream of an optical amplifier located at the optical path of the laser light.

10. A method of controlling pulsed laser oscillation, comprising the step of changing a voltage applied to at least one first electrooptical element that polarizes light according to the applied voltage, to control oscillation of laser light,
further comprising the step of changing over time a voltage value applied to the first electrooptical element, to increase a pulse width of laser light which has passed through the first electrooptical element.

11. The method of controlling the pulsed laser oscillation according to claim 10,
wherein at least one first electrooptical element is a plurality of first electrooptical elements,
wherein the step of changing over time the voltage value comprises the step of changing over time each voltage value applied to each of the plurality of first electrooptical elements.

12. The method of controlling the pulsed laser oscillation according to claim 10, wherein the step of changing over time the voltage value comprises the step of changing in a stepwise manner a rate of change of the voltage value applied to the first electrooptical element.

13. The method of controlling the pulsed laser oscillation according to claim 11, wherein the plurality of first electrooptical elements is two first electrooptical elements,
the method further comprising the step of applying each of the two first electrooptical elements with a voltage in directions opposite to each other by a voltage control unit.

* * * * *